US006539451B1

United States Patent
Zani et al.

(10) Patent No.: US 6,539,451 B1
(45) Date of Patent: Mar. 25, 2003

(54) DATA STORAGE SYSTEM HAVING MASTER-SLAVE ARBITERS

(75) Inventors: Mark Zani, Derry, NH (US); Scott Romano, Newton, MA (US); Alfred Dellicicchi, Acton, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/224,194

(22) Filed: Dec. 30, 1998

(51) Int. Cl.$^7$ ................................................ G06F 13/36
(52) U.S. Cl. ...................... 710/309; 710/305; 710/241; 710/110; 710/39; 714/42; 714/43; 714/44
(58) Field of Search ................................. 710/128–132, 710/110, 111, 112–114, 241–244, 39, 40; 714/9, 40, 43, 42, 48; 711/100, 111, 112, 114, 117

(56) References Cited

U.S. PATENT DOCUMENTS

| | | | | |
|---|---|---|---|---|
| 5,206,939 A | | 4/1993 | Yanai et al. ................. 395/400 |
| 5,699,533 A | * | 12/1997 | Sakai ......................... 710/131 |
| 5,815,680 A | * | 9/1998 | Okumura et al. ............ 710/131 |
| 5,839,906 A | * | 11/1998 | Leshem ........................ 439/61 |
| 6,141,713 A | * | 10/2000 | Kang ........................... 710/107 |
| 6,145,042 A | * | 11/2000 | Walton ......................... 710/112 |
| 6,195,770 B1 | * | 2/2001 | Walton .......................... 714/53 |
| 6,230,229 B1 | * | 5/2001 | Van Krevelen et al. ..... 710/131 |
| 6,272,591 B2 | * | 8/2001 | Grun ............................ 711/114 |

* cited by examiner

Primary Examiner—Peter Wong
Assistant Examiner—Raymond N Phan
(74) Attorney, Agent, or Firm—Daly, Crowley & Mofford, LLP

(57) ABSTRACT

A data storage system wherein a host computer is coupled to a bank of disk drives through a system interface. The interface has a memory with a high address memory section and a low address memory section. A plurality of directors control data transfer between the host computer and the bank of disk drives as such data passes through the memory. A pair of high address busses electrically is connected to the high address memory and a pair of low address busses is electrically connected to the low address memory. Each one of the directors is electrically connected to one of the pair of high address busses and one of the pair of low address busses. A front-end portion of the directors is electrically connected to the host computer and a rear-end portion of the directors is electrically connected to the bank of disk drives. The bank of disk drives has a plurality of sets of electrically connected disk drives, each one of the sets being connected to a corresponding one of the input/output interfaces of a corresponding one of the rear-end directors through the adapter card connected to such corresponding one of the rear-end directors and, through the printed circuit board, to the adapter card in the another one of the electrical connectors and to the input/output interface of the rear-end director in such other one of the electrical connectors. Each pair of a plurality of bus arbiters is electrically connected to ends of a corresponding one of the busses. One of the arbiters is a master arbiter and the other a slave arbiter. A pair of reference voltage generator is also connected to ends of each bus.

14 Claims, 25 Drawing Sheets

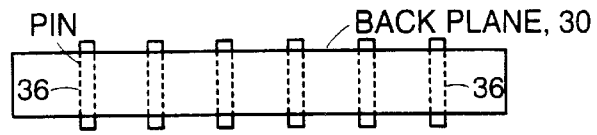
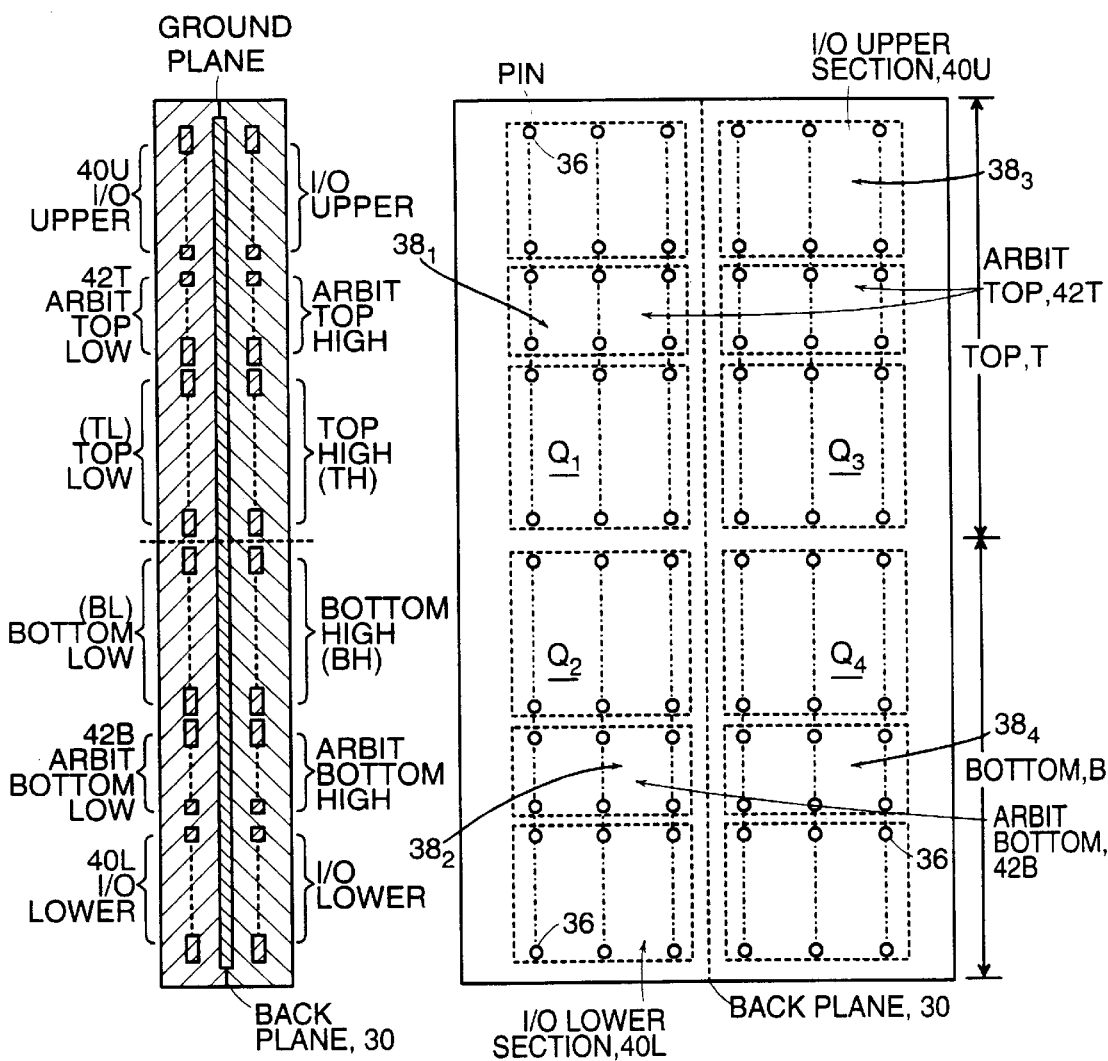
FIG. 4B
FIG. 4C          FIG. 4A

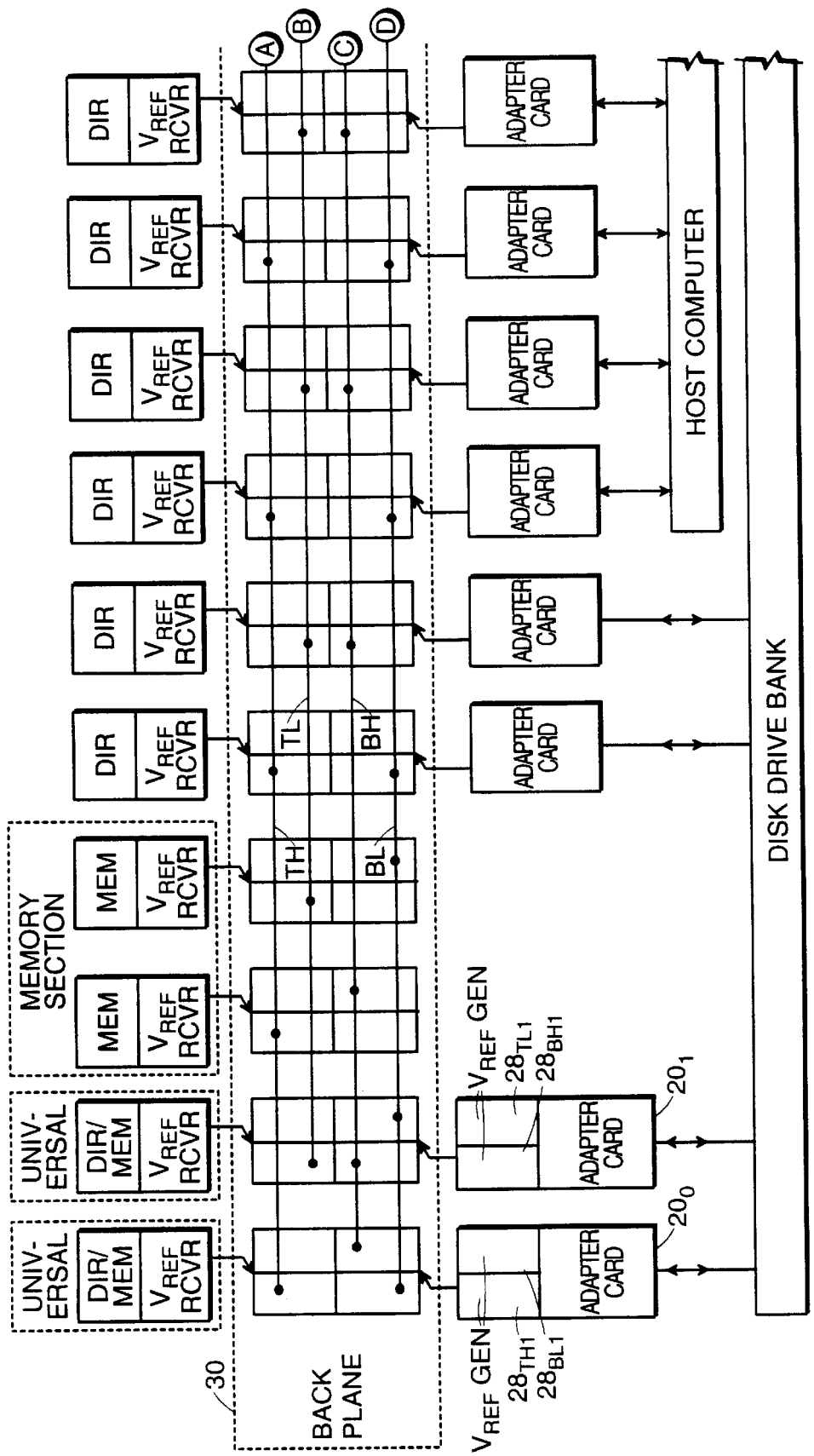

DATA STORAGE SYSTEM HAVING MASTER-SLAVE ARBITERS

BACKGROUND OF THE INVENTION

This invention relates generally to data storage systems, and more particularly to data storage systems having redundancy arrangements to protect against total system failure in the event of a failure in a component or subassembly of the storage system.

As is known in the art, large mainframe computer systems require large capacity data storage systems. These large main frame computer systems generally includes data processors which perform many operations on data introduced to the computer system through peripherals including the data storage system. The results of these operations are output to peripherals, including the storage system.

One type of data storage system is a magnetic disk storage system. Here a bank of disk drives and the main frame computer system are coupled together through an interface. The interface includes CPU, or "front end", controllers (or directors) and "back end" disk controllers (or directors). The interface operates the controllers (or directors) in such a way that they are transparent to the computer. That is, data is stored in, and retrieved from, the bank of disk drives in such a way that the mainframe computer system merely thinks it is operating with one mainframe memory. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

As described in such U.S. Patent, the interface may also include, in addition to the CPU controllers (or directors) and disk controllers (or directors), addressable cache memories. The cache memory is a semiconductor memory and is provided to rapidly store data from the main frame computer system before storage in the disk drives, and, on the other hand, store data from the disk drives prior to being sent to the main frame computer. The cache memory being a semiconductor memory, as distinguished from a magnetic memory as in the case of the disk drives, is much faster than the disk drives in reading and writing data.

The CPU controllers, disk controllers and cache memory are interconnected through a backplane printed circuit board. More particularly, disk controllers are mounted on disk controller printed circuit boards. CPU controllers are mounted on CPU controller printed circuit boards. And, cache memories are mounted on cache memory printed circuit boards. The disk controller, CPU controller and cache memory printed circuit boards plug into the backplane printed circuit board. In order to provide data integrity in case of a failure in a controller, the backplane printed circuit board has a pair of buses. One set the disk controllers is connected to one bus and another set of the disk controllers is connected to the other bus. Likewise, one set the CPU controllers is connected to one bus and another set of the CPU controllers is connected to the other bus. The cache memories are connected to both buses. Each one of the buses provides data, address and control information.

Thus, the use of two buses provides a degree of redundancy to protect against a total system failure in the event that the controllers, or disk drives connected to one bus fail. Further, the use of two buses increases the data transfer bandwidth of the system compared to a system having a single bus.

SUMMARY OF THE INVENTION

In accordance with the invention, an arbiter is electrically connected to each one of the busses.

In accordance with another feature of the invention, the arbiter is connected to an end of the busses.

In accordance with another feature of the invention, a second arbiter connected to another end of the bus, the arbiter connected to one end of a bus being a master arbiter and the arbiter connected to the other end of the bus being a slave arbiter. The master arbiter provides arbitration between directors connected to the bus and, if one of the directors connected to such bus indicates a fault, the master arbiter is disabled and the slave arbiter is enable to provide such arbitration.

In accordance with another feature of the invention, the system includes a printed circuit board having the plurality of busses and a plurality of electrical connectors arranged in a linear array and electrically connected to the busses. The electrical connectors are adapted to receive the directors on one side of the printed circuit board and adapter cards on the other side of the printed circuit board. The directors and adapter cards received in a common one of the electrical connectors are electrically connected by pins passing from one side to the other side of the printed circuit board. Adapter cards connected to the terminating ends of a bus, and received in end ones of the electrical connectors, have thereon the master arbiter and slave arbiter. Pins in the electrical connectors at the ends of the bus are adapted to receive either an adapter card having the master arbiter or an adapter card having the slave arbiter. The electrical connector at one end of the bus has a reference electrical potential on a pin thereof and the electrical connector at the other end of the bus has a high impedance thereon on a pin thereof. The pins are in the same position of both electrical connectors. When the adapter cards are received by the electrical connectors, the reference electrical potential at the pin configures the adapted card connected thereto into one of the master or slave arbiters and the high impedance at the pin configures the adapted card connected thereto into the other one of the master or slave arbiters.

In accordance with another feature of the invention, each one of the directors is adapted to produce on the bus coupled thereto a plural bit priority code. Each one of the arbiters is responsive to the priority code of the directors coupled thereto and assigns access to such bus coupled to such directors selectively in accordance with a predetermined criteria.

SUMMARY OF THE (Vref GENERATION) INVENTION

In accordance with another feature of the invention, a plurality of reference voltage generators is provided, each being electrically connected to a corresponding one of the buses. The bus couples the generated reference voltage to each one of the directors electrically connected to such bus. Each one of the directors electrically connected to the bus includes a reference voltage receiver response to the generated reference voltage for distributing the generated reference voltage among electrical components in such director.

In accordance with another feature of the invention, a pair of reference voltage generators is electrically connecting to ends of a corresponding one of the busses.

In accordance with another feature of the invention, the reference voltage generator includes a input section adapted to vary the reference voltage produced by the reference voltage generator.

In accordance with another feature of the invention, the input section comprises a digital to analog converter.

BRIEF DESCRIPTION OF THE DRAWING

These and other features of the invention will become more readily apparent from the following detailed description when read together with the accompanying drawings, in which;

FIGS. 4A–4C are front, top, and side diagrammatical sketches, respectively, of a backplane printed circuit board and electrical connectors therein used in the system interface of FIG. 3;

Description of the Preferred Embodiments System Architecture

Figures 1, 1A:
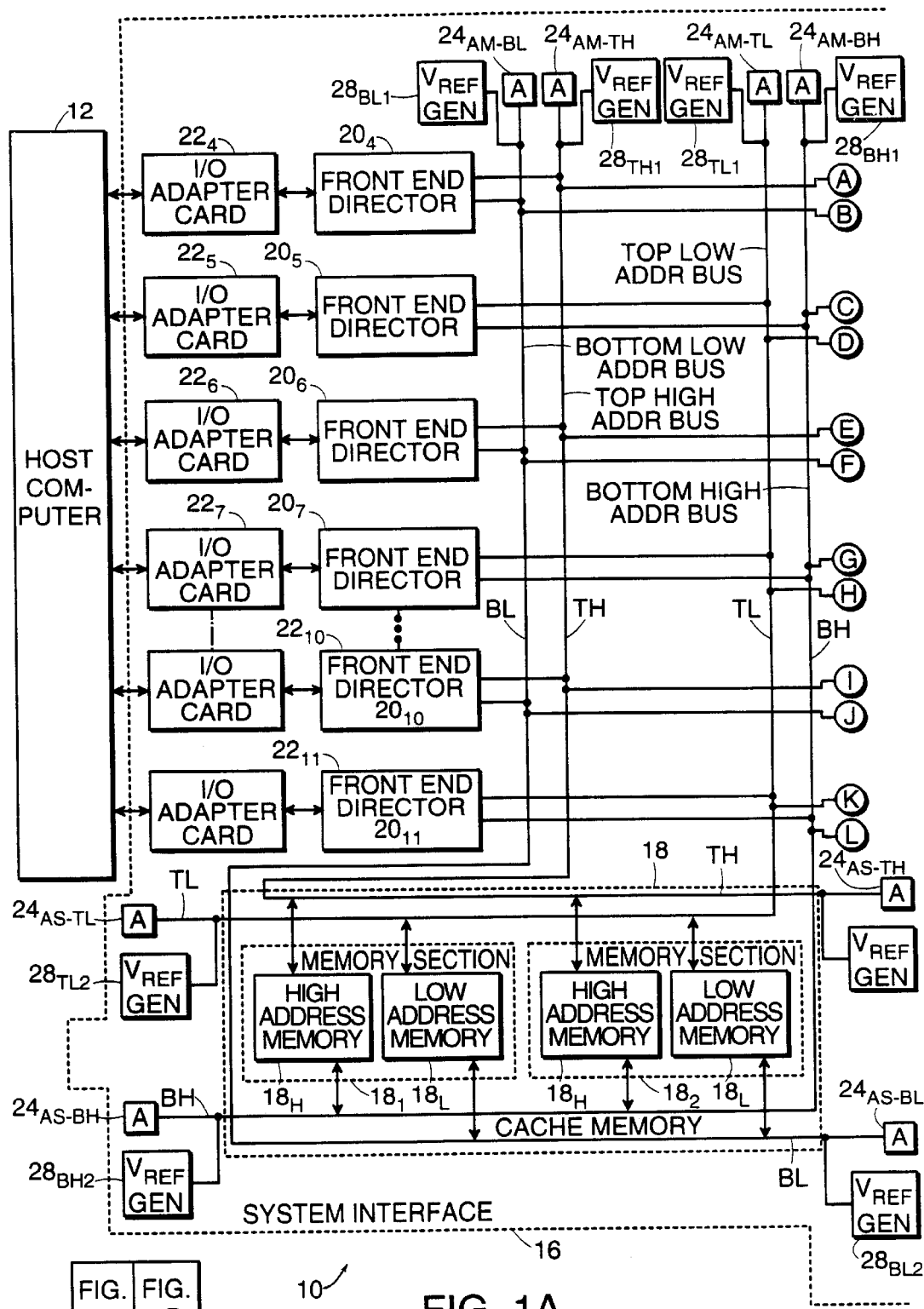
FIG. 1 is a block diagram of a data storage system according to the invention.
Figure 1B:
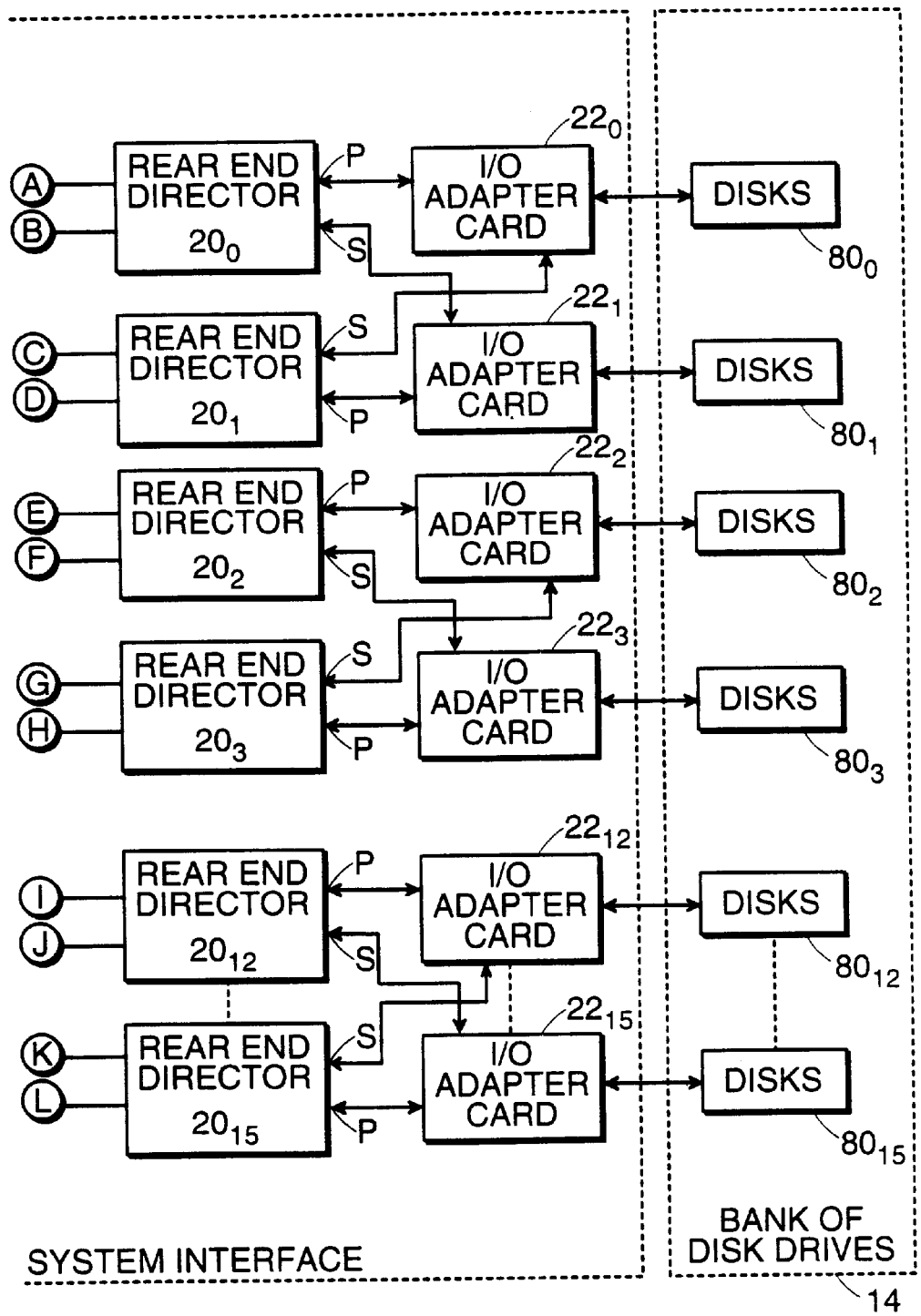

Referring now to FIG. 1, a data storage system 10 is shown wherein a host computer 12 is coupled to a bank 14 of disk drives through a system interface 16. The system interface 16 includes a cache memory 18, having high address memory sections 18H and low address memory sections 18L. A plurality of directors $20_0$–$20_{15}$ is provided for controlling data transfer between the host computer 12 and the bank 14 of disk drives as such data passes through the cache memory 18. A pair of high address busses TH, BH is electrically connected to the high address memory sections 18H. A pair of low address busses TL, BL electrically connected to the low address memory sections 18L. The cache memory 18 has a plurality of storage location addresses. Here, the storage locations having the higher addresses are in the high address memory sections 18H and the storage locations having the lower addresses are in the low address memory sections 18L. It should be noted that each one of the directors $20_0$–$20_{15}$ is electrically connected to one of the pair of high address busses TH, BH and one of the pair of low address busses TL, BL. Thus, each one of the directors $20_0$–$20_{15}$ is able to address all locations in the entire cache memory 18 (i.e., to both the high address memory sections 18H and the low address memory sections 18L) and is therefore able to store data in and retrieve data from any storage location in the entire cache memory 18.

More particularly, a rear-end portion of the directors, here directors $20_0$–$20_3$ and $20_{12}$–$20_{15}$, is electrically connected to the bank 14 of disk drives through I/O adapter cards $22_0$–$22_3$ and $22_{12}$–$22_{15}$ and a front-end portion of the directors, here directors $20_4$–$20_{11}$, is electrically connected to the host computer 12 through I/O adapter cards $22_4$–$22_{11}$. It should also be noted that each end of the busses TH, TL, BH, BL terminates in a pair of master and slave arbiters bus arbiters $24_{AM\_TH}$, $24_{AS\_TH}$; $24_{AM\_TL}$, $24_{AS\_TL}$, $24_{AM\_BH}$, $24_{AS\_BH}$; $24_{AM\_BL}$, $24_{AS\_BL}$, respectively; and a pair of a pair of reference voltage (Vref) generator 28TH1, 28TH2; 28TL1, 28TL2; 28BH1, 28BH2; 28BL1, 28BL2, respectively.

In operation, when the host computer 12 wishes to store data, the host computer 12 issues a write request to one of the front-end directors $20_4$–$20_{11}$ to perform a write command. One of the front-end directors $20_4$–$20_{11}$ replies to the request and asks the host computer 12 for the data. After the request has passed to the requesting one of the front-end directors $20_4$–$20_{11}$, the director determines the size of the data and reserves space in the cache memory 18 to store the request. The front-end director then produces control signals on either a high address memory bus (TH or BH) or a low address memory bus (TL, BL) connected to such front-end director depending on the location in the cache memory 18 allocated to store the data and enable the transfer to the cache memory 18. The host computer 12 then transfers the data to the front-end director. The front-end director then advises the host computer 12 that the transfer is complete. The front-end director looks up in a Table, not shown, stored in the cache memory 18 to determine which one of the rear-end directors $20_0$–$20_3$ and $20_{12}$–$20_{15}$ is to handle this request. The Table maps the host computer 12 address into an address in the bank 14 of disk drives. The front-end director then puts a notification in a "mail box" (not shown and stored in the cache memory 18) for the rear-end director which is to handle the request, the amount of the data and the disk address for the data. Other rear-end directors poll the cache memory 18 when they are idle to check their "mail boxes". If the polled "mail box" indicates a transfer is to be made, the rear-end director processes the request, addresses the disk drive in the bank, reads the data from the cache memory and writes it into the addresses of a disk drive in the bank 14. When data is to be read from the disk drive to the host computer 12 the system operates in a reciprocal manner.

Figures 2, 2A:
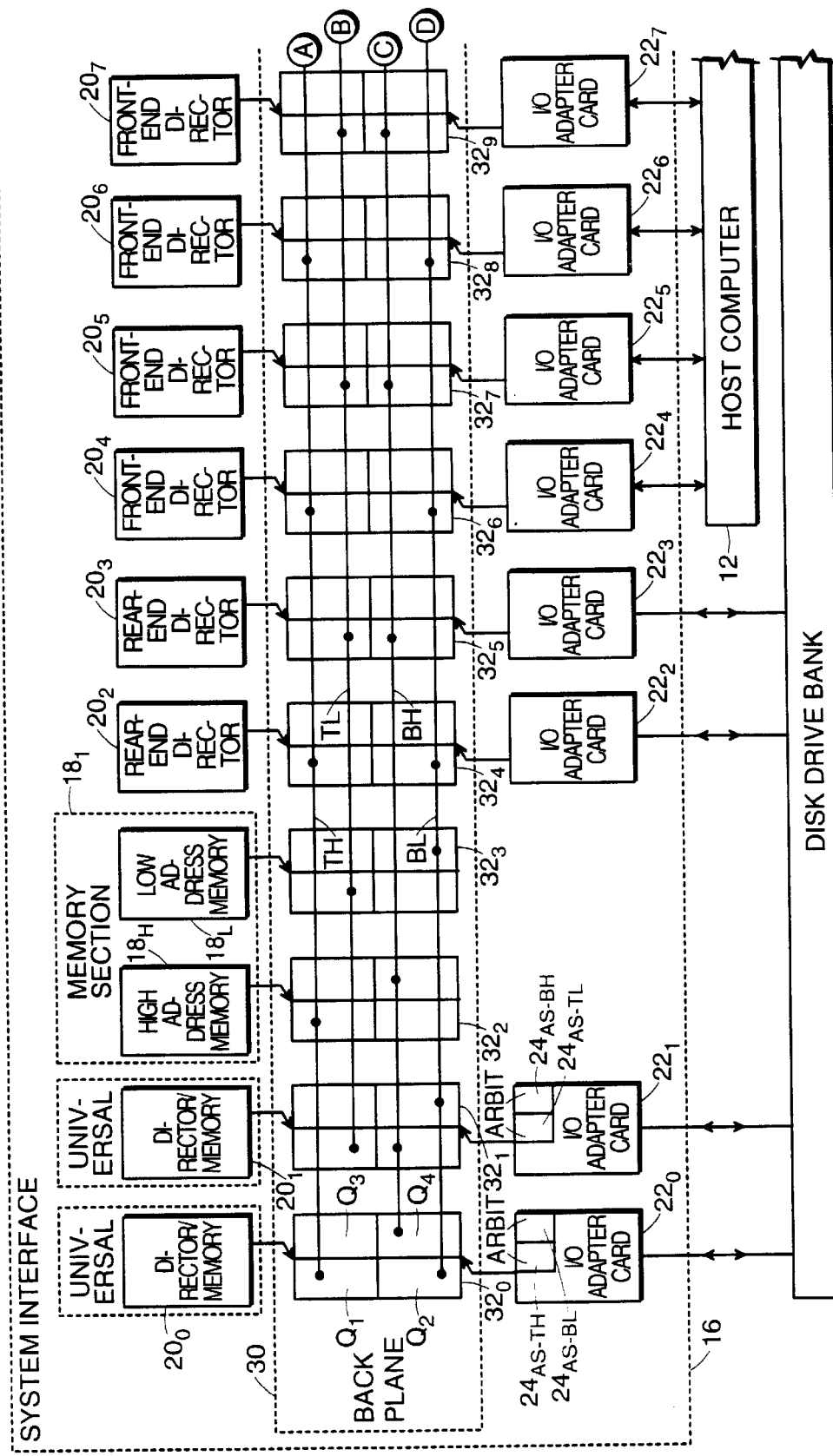
FIG. 2 is a diagram showing a layout of the data storage system of FIG. 1.
Figure 2B:
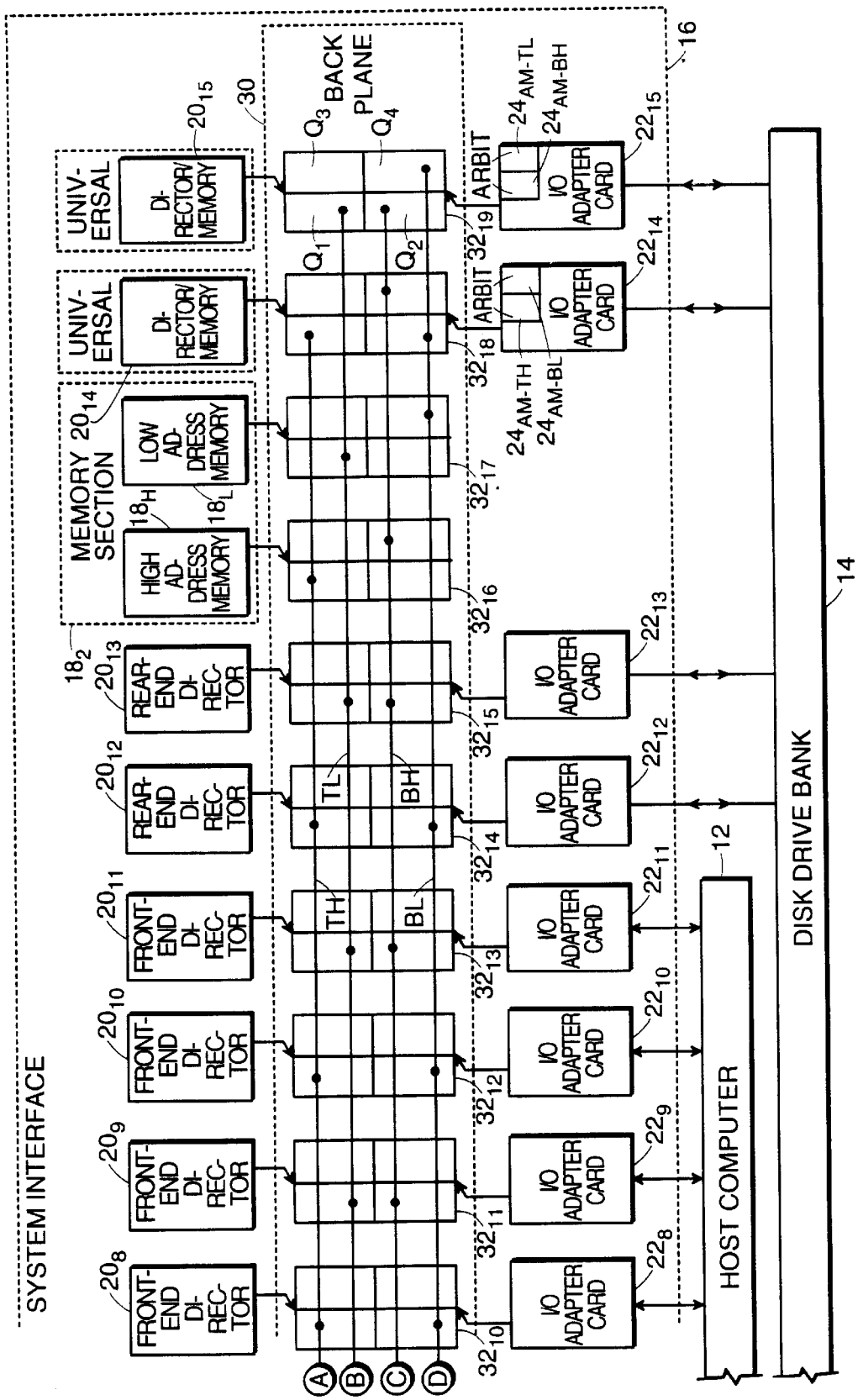
Figure 3:
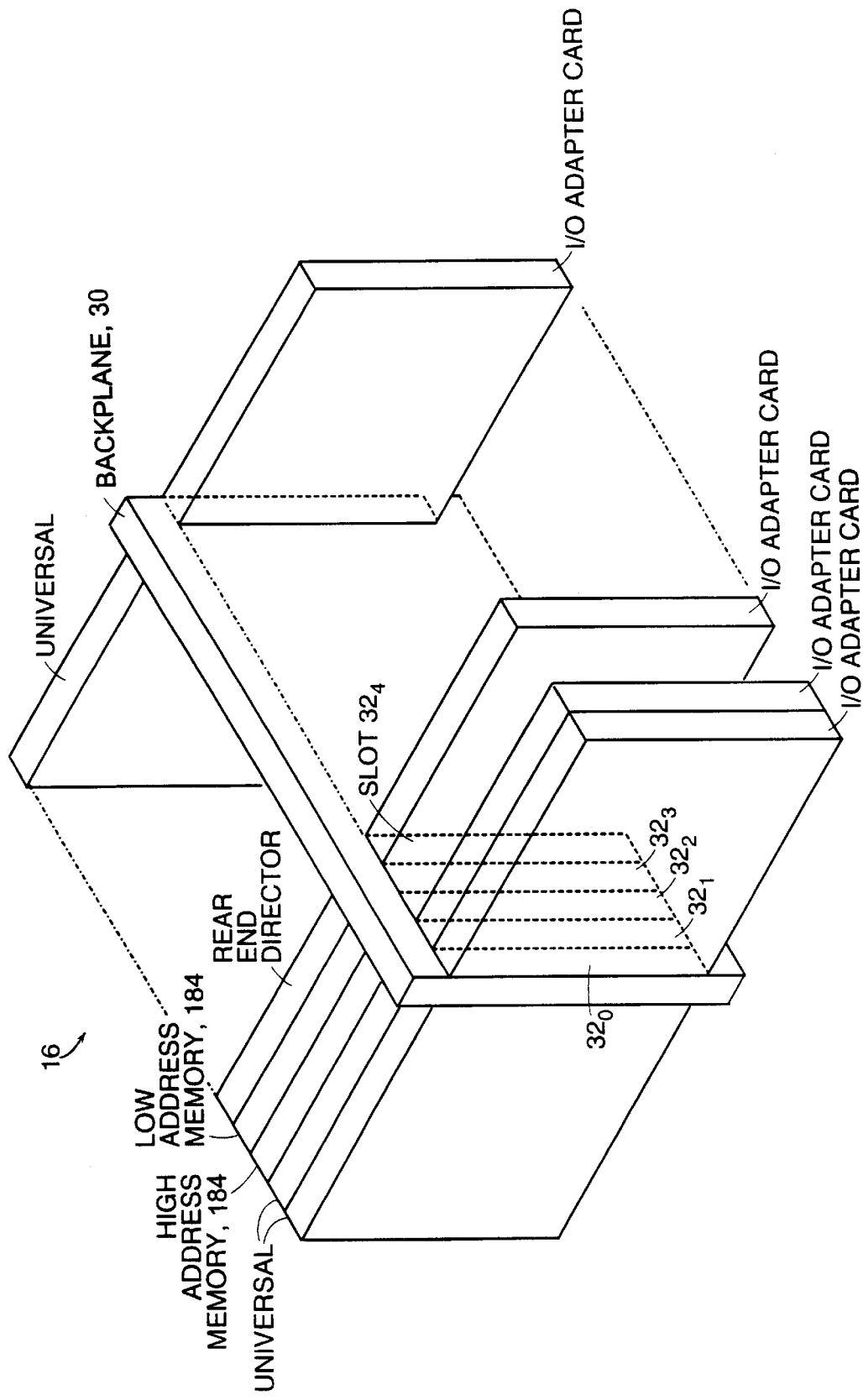
FIG. 3 is an isometric sketch of a system interface used in the system of FIG. 1.

More particularly, and referring also to FIGS. 2 and 3, the system interface 16 includes a backplane printed circuit board 30 having a plurality of, here 20, electrical connectors $32_0$–$32_{19}$, or slots, arranged successively and uniformly spaced in a linear array. The electrical connectors $32_0$–$32_{19}$ are connected selectively to the busses TH, TL, BH, BL, such selective electrical connections being indicated by the "dot" (•) in FIG. 2. Each one of the electrical connectors $32_4$–$32_{15}$ is adapted to receive a corresponding one of the directors $20_4$–$20_{15}$, respectively, electrical connectors $32_2$ and $32_3$ are adapted to receive high address memory 18H and low address memory 18L of memory section $18_1$, and electrical connectors $32_{16}$ and $32_{17}$ are adapted to receive high address memory 18H and low address memory 18L of memory section $18_2$, as indicated. It is first noted that electrical connectors $32_0$, $32_1$, $32_{18}$ and $32_{19}$ are adapted to receive either a director or a memory. Here the electrical connectors $32_0$, $32_1$, $32_{18}$, and $32_{19}$ are described as having received directors $20_0$, $20_1$, $20_{14}$, and $20_{15}$, respectively.

It is noted that alternating ones of the directors, (i.e, directors $20_0$, $20_2$, $20_4$, $20_6$, $20_8$, $20_{10}$, $20_{12}$, and $20_{14}$), are electrically connected to one of the high address memory busses, here bus TH and to one of the low address memory busses, here bus BL, while the directors interleaved with such alternating ones of the directors (i.e., directors $20_1$, $20_3$, $20_5$, $20_7$, $20_9$, $20_{11}$, $20_{13}$, and $20_{15}$), are electrically connected to the other one of the high address memory busses, here bus BH and to the other one of the low address memory busses, here bus TL. It is noted that each one of the busses TH, TL, BH, BL extends along the length of the backplane printed circuit board 30.

Each one of the electrical connectors $32_0$–$32_{19}$ is identical in construction. An exemplary one thereof, here connector $30_0$ is shown in FIGS. 4A–4C mounted to the backplane printed circuit board 30. (It is noted that because directors $20_0$–$20_{15}$ are received in one side of the backplane 30 and input/output I/O adapter cards $22_0$–$22_{15}$ are received on the other side of the backplane 30, the "backplane" may be regarded as a "midplane" printed circuit board. That is, the "backplane" has printed circuit boards (i.e, an I/O adapter cards $22_0$–$22_{15}$ and director cards $20_0$–$20_{15}$ (or memory card 18H, 18L) plugged into opposite sides of it, as shown in FIG. 3).

Here, the exemplary electrical connector $32_0$ (FIGS. 4A–4C) is a model VHDM manufactured by Teradyne, Boston, Mass., and has a plurality of electrically conductive pins 36 therein which pass through the backplane 30 for electrical connection to the I/O adapter cards $22_0$–$22_{15}$ and a director cards $20_0$–$20_{15}$ (or memory card 18) plugged into opposite ends of the pins 36. It is also noted that the electrical connector $32_0$ is separated into four sections $38_1$–$38_4$, (i.e., a top left section $38_1$, a bottom left section $38_2$, a bottom right section $38_3$ and a top right section $38_4$, as indicated.) It is next noted that the upper portion of both top sections $38_1$ and $38_3$ provide an upper input/output pin section $40_U$ for the received directors $20_0$–$20_{15}$ and I/O adapter cards $22_0$–$22_{15}$ and the lower portion of both bottom sections $38_2$ and $38_4$ provide a lower input/output pin section $40_L$ for the received directors 20 and I/O adapter cards 22. It is next noted that the lower portion of both top sections $38_1$ and $38_3$ provide two quadrants $Q_1$, $Q_3$ of pins for the received directors 20 (or memory 18) and that the upper portion of both bottom sections $38_2$ and $38_4$ provide two quadrants $Q_2$, $Q_4$ of pins for the received directors 20 (or memory 18). Next, it should be noted that an arbiter pin section $42_T$ is provided between input/output section $40_U$ and quadrant $Q_1$ and an arbiter pin section $42_B$ is provided between input/output section $40_L$ and quadrant $Q_2$ for receiving the arbiters $24_{AM-TH}$, $24_{AM-BL}$, respectively, (FIGS. 1 and 2).

The backplane printed circuit board 30 is a multi-layer printed circuit board having a ground plane conductor 50, as shown in FIG. 4C. It is noted that the four busses TH, TL, BH, BL, are disposed on different electrically isolated layers of the backplane. It is further noted that the busses TH, and TL are disposed on the top (T) portion of the backplane 30; bus TH being electrically connected to the high (H) address memories 18H and bus TL being electrically connected to the low (L) address memories 18L. The busses BH, and BL are disposed on the bottom (B) portion of the backplane 30; bus BH being electrically connected to the high (H) address memories 18H and bus BL being electrically connected to the low (L) address memories 18L. It is noted that, referring to FIG. 2, for the electrical connectors $32_4$, $32_6$, $32_8$, $32_{10}$, $32_{12}$, and $32_{14}$, (i.e., here electrical connector which receive only directors) the pins in quadrant $Q_1$ are connected to bus TH and the pins in quadrant $Q_2$ are connected to bus BL. For the electrical connectors $32_5$, $32_7$, $32_9$, $32_{11}$, $32_{13}$, and $32_{15}$, (i.e. electrical connectors which receive only directors) the pins in quadrant $Q_1$ are connected to bus TL and the pins in quadrant $Q_2$ are connected to bus BH. For the electrical connectors $32_2$ and $32_3$, $32_{16}$, and $32_{17}$ (i.e. electrical connectors which receive only memories $18_H$ or $18_L$) the pins in quadrant $Q_1$ are connected to busses TH or TL, as indicated and the pins in quadrant $Q_4$ are connected to busses BH or BL, as indicated. Thus, directors 20 are connected to pins in quadrants $Q_1$ and $Q_2$ while memories 18 are connected to quadrants $Q_1$ and $Q_4$. It is noted that electrical connectors $32_0$, $32_1$, $32_{18}$ and $32_{19}$ are wired to the quadrants $Q_1$, $Q_2$ and $Q_4$ to provide universal slots adapted to receive either a memory 18 or a director 20. Thus, here in FIG. 2, electrical connectors $32_0$ and $32_{18}$ are connected to busses TH, BL and BH to receive either a director or a high address memory. Electrical connectors $32_1$ and $32_{19}$ are connected to busses TL, BH and BL to receive either a director or a low address memory.

Figure 5:
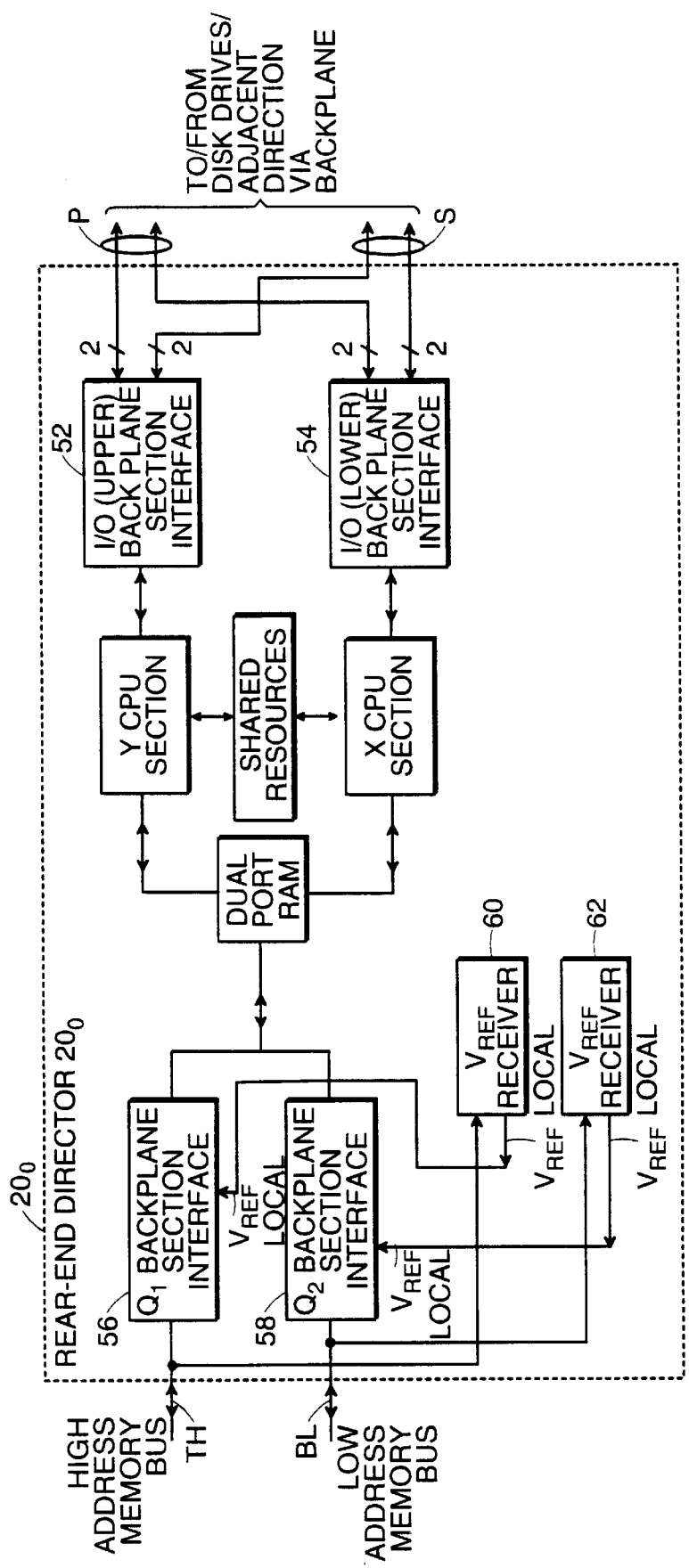
FIG. 5 is a schematic diagram of an exemplary one of a plurality of rear-end directors used in the system of FIG. 1.
Figure 5A:
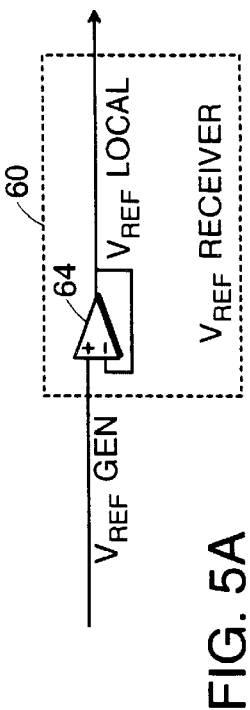
FIG. 5A is a schematic diagram of a reference voltage generator used in the director of FIG. 5.

Each one of the rear-end portion of the directors $20_0$–$20_3$ is identical in construction, an exemplary one therefor, here rear-end director $20_0$ being shown in FIG. 5 to include a pair of central processing sections, CPU X and CPU Y, a dual port random access memory (RAM), and shared resources (Flash memories, etc,) arranged as shown, coupled to the bank 14 of disk drives (FIG. 1) through I/O adapter card $22_0$ (FIG. 1) via an I/O upper backplane section interface 52 (FIG. 5) and I/O lower backplane section interface 54, as indicated and to a high address memory bus, here TH, and low address memory bus, here BL, via a $Q_1$ and $Q_2$ backplane interface sections 56, 58 respectively. The rear-end director $20_0$ includes a pair of Vref receivers 60, 62 for receiving a Vref voltage generated on the memory busses TH and BL, in a manner to be described in detail in connection with FIGS. 10, 11, and 12. Suffice it to say here, however, that the Vref generated on the memory busses is transmitted on such memory busses to the receivers 60, 62 and that the receivers 60, 62 distribute such received reference voltage Vref locally to the interface sections 56 and 58. An exemplary one of the receivers 60, 62, here receiver 62, is shown in FIG. 5A to include a high input impedance operational amplifier 64 having the non-inverting input thereof fed by the Vref voltage on the memory buss. The output of the amplifier 64 is coupled to the inverting input thereof and provides the local reference voltage Vref for the interfaces 56 and 58. It is noted that the Vref generated on the high address memory bus, i.e., here, TH, is fed to Vref receiver 60 and that receiver 60 provides the reference voltage to the $Q_1$ backplane section interface section 56. The Vref generated on the low address memory bus, i.e., here, BL, is fed to Vref receiver 62 and that receiver 62 provides the reference voltage to the $Q_2$ backplane section interface section 58. Finally, it should be noted that the director has a primary output port, P, and a secondary output port, S. As will be described in detail in connection with FIG. 8, the primary port P is connected to both I/O backplane interface 52 and I/O backplane interface 54. Likewise, the secondary port S is connected to both I/O backplane interface 52 and I/O backplane interface 54.

Figure 6:
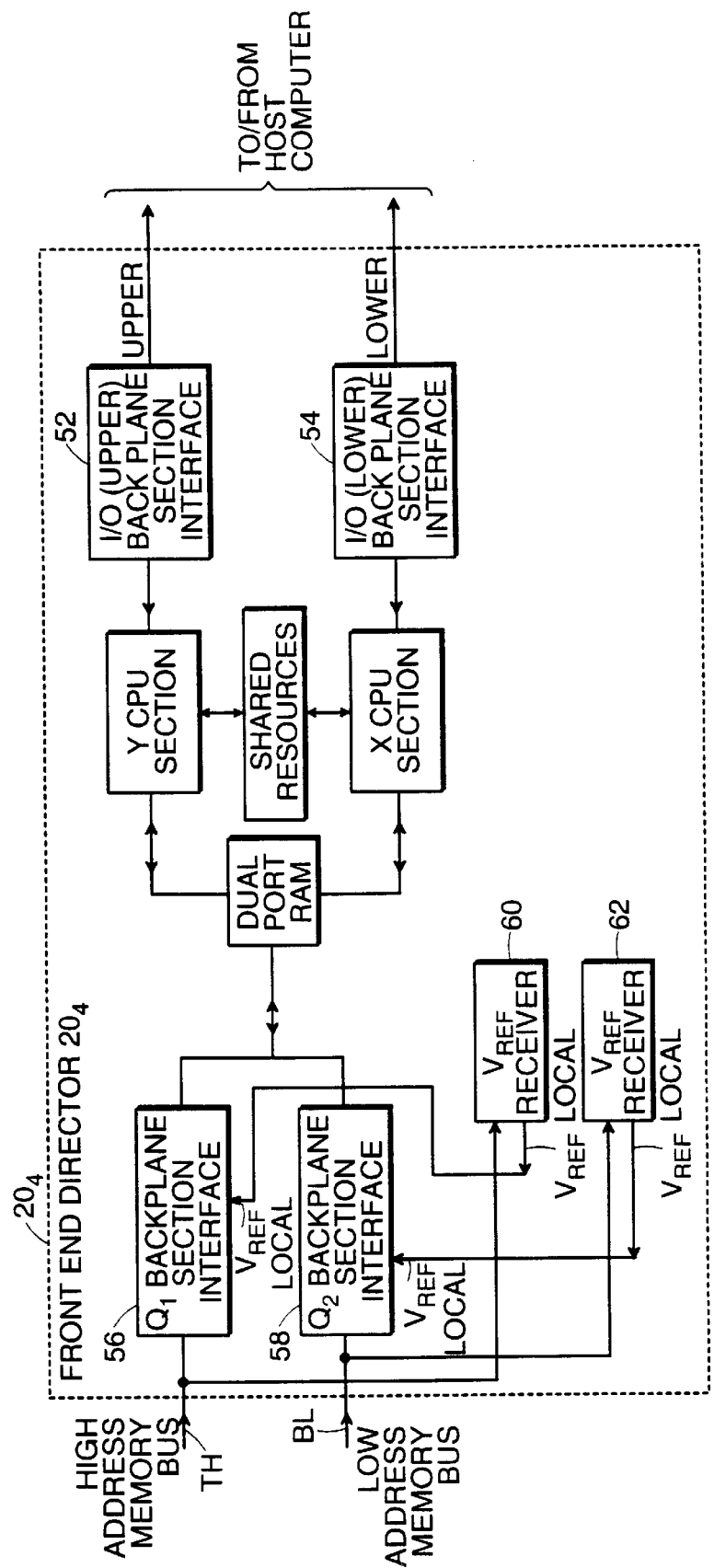
FIG. 6 is a schematic diagram of an exemplary one of a plurality of front-end directors used in the system of FIG. 1.

Each one of the front-end portion of the directors $20_4$–$20_{11}$ is identical in construction. An exemplary one thereof, here director $20_4$ is shown in detail in FIG. 6 to include a pair of central processing sections, CPU X and CPU Y, a dual port random access memory (RAM), and shared resources (Flash memories, etc,) arranged as shown, coupled to the host computer (through an adapter, not shown), as indicated and to a high address memory bus, here TH, and low address memory bus, here BL, via a $Q_1$ and $Q_2$ backplane interface sections 56, 58, respectively. The front-end directors include a pair of the Vref receivers 60 for receiving generated Vref voltage transmitted to the receivers on the high and low address memory busses as described above in connection with FIG. 5. It is noted that here the interfaces 52, 54 are connected to the host computer as described above in connection with FIGS. 1 and 2.

Figure 7:
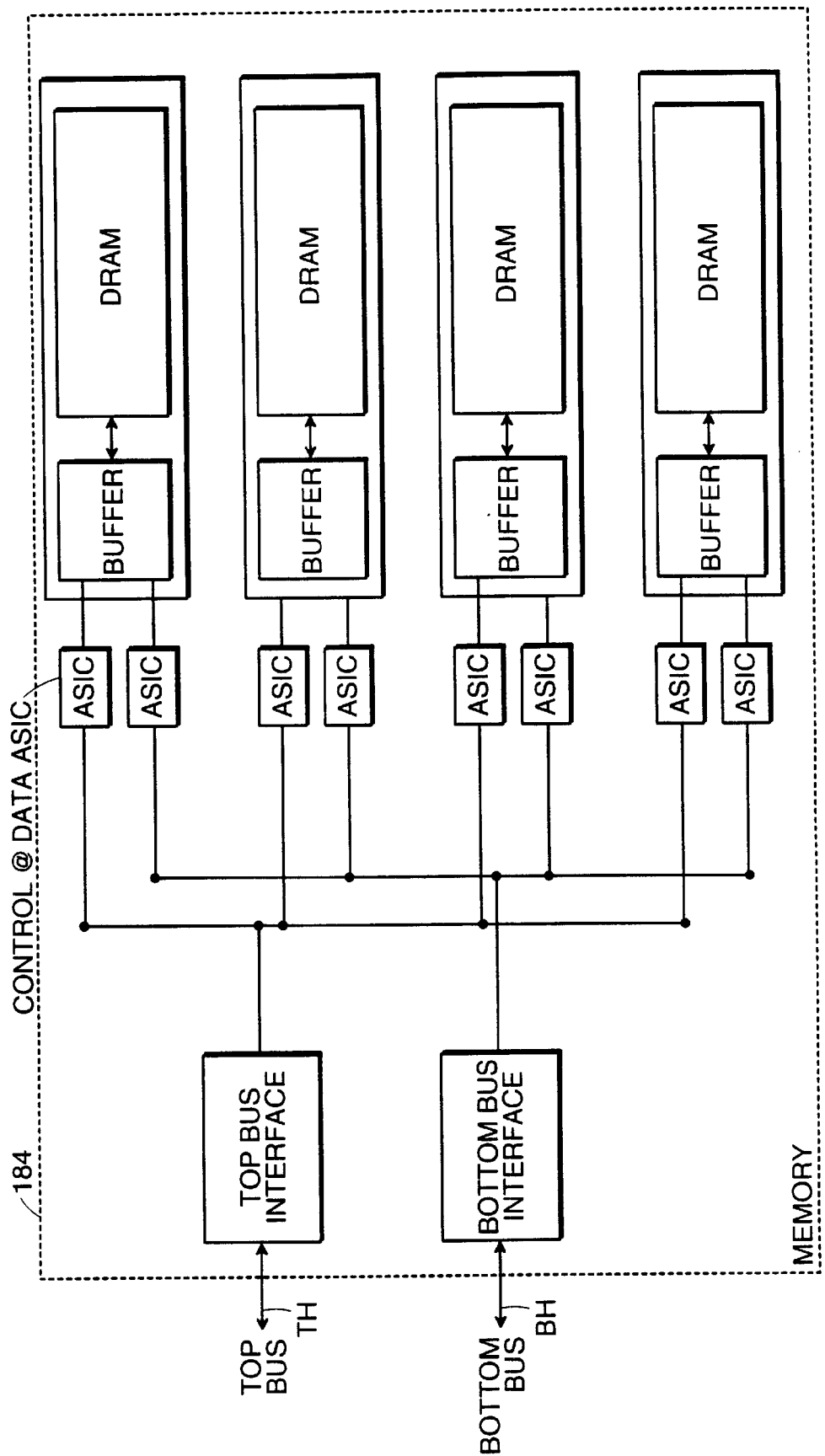
FIG. 7 is a schematic diagram of a memory section used in the system of FIG. 1.

An exemplary one of the memories is shown in FIG. 7 to include a plurality of here four DRAM sections coupled to the top and bottom busses though bus interfaces and ASIC control logics, as indicated.

Dual Initiator

Figure 8:
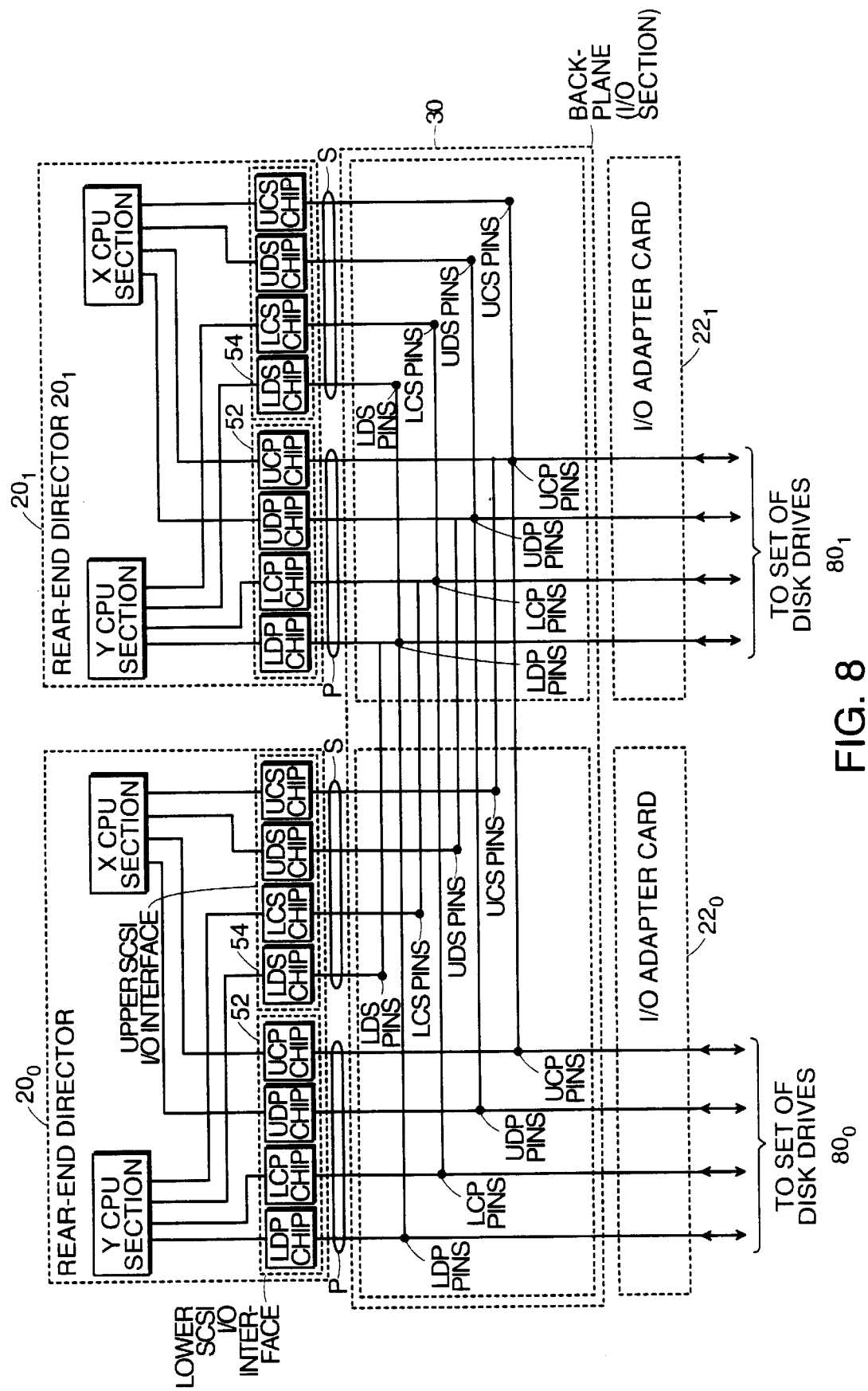
FIG. 8 is a schematic diagram of a pair of adjacent I/O adapter cards, their associated rear-end directors and SCSI I/O interfaces of the directors interconnected through the backplane printed circuit board of FIG. 3 in accordance with the invention.

As noted above in connection with FIGS. 1 and 2, a front-end portion of the directors $20_4$–$20_{11}$ is coupled to the host computer 12 and rear-end portion of the directors $20_0$–$20_3$ and $20_{12}$–$20_{15}$ is coupled to the disk drive bank 14. As described in connection with FIG. 5, each one of the rear-end directors $20_0$–$20_3$ and $20_{12}$–$20_{15}$ has upper and lower input/output interface 52, 54 coupled to bank 14 of disk drives. The bank 14 of disk drives has a plurality of sets $80_0$–$80_3$ and $80_{12}$–$80_{15}$ (FIG. 1) of electrically connected disk drives. Each one of the rear-end directors $20_0$–$20_3$ and $20_{12}$–$20_{15}$ has a pair of input/output terminals; i.e. a primary input/output terminals P and a secondary input/output terminals S. Each one of the sets $80_0$–$80_3$ and $80_{12}$–$80_{15}$ of disk drives is connected to the primary input/output terminals P and to the secondary input/output terminals S of an adjacent pair of the rear-end directors through an adapter card 22, as indicated in FIG. 1, and in FIGS. 6 and 7, for an exemplary pair of directors, here the pair of adjacent rear-end directors $20_0$ and $20_1$. Thus, for redundancy, two different rear-end directors are able to communicate with any one set of disk drives, as shown in FIG. 8. Thus, for example, set $80_0$ is coupled to the primary terminal P of rear-end director $20_0$ and, for redundancy in case there is a failure in director $20_0$, set $80_0$ is connected to the secondary terminal S of director $20_1$. Further, directors $20_0$ and $20_1$ are on different sets of busses (i.e., busses TH and BL for director $20_0$ and busses TL and BH for director $20_1$) for additional redundancy.

More particularly, the primary input/output terminals P of director 200 are connected to: (1) the disk drive set $80_0$ through the backplane 30 and to the I/O adapter card $22_0$; and (2) the secondary input/output S of the adjacent director $20_1$ through the backplane 30, as shown in FIG. 5. Reciprocally, the primary input/output terminals P of director $20_1$ are connected to: (1) the disk drive set $80_1$ through the backplane 30 and the I/O adapter card $22_1$; and (2) the secondary input/output pins S of the adjacent director $20_0$ through the backplane 30.

Figures 9, 9A:
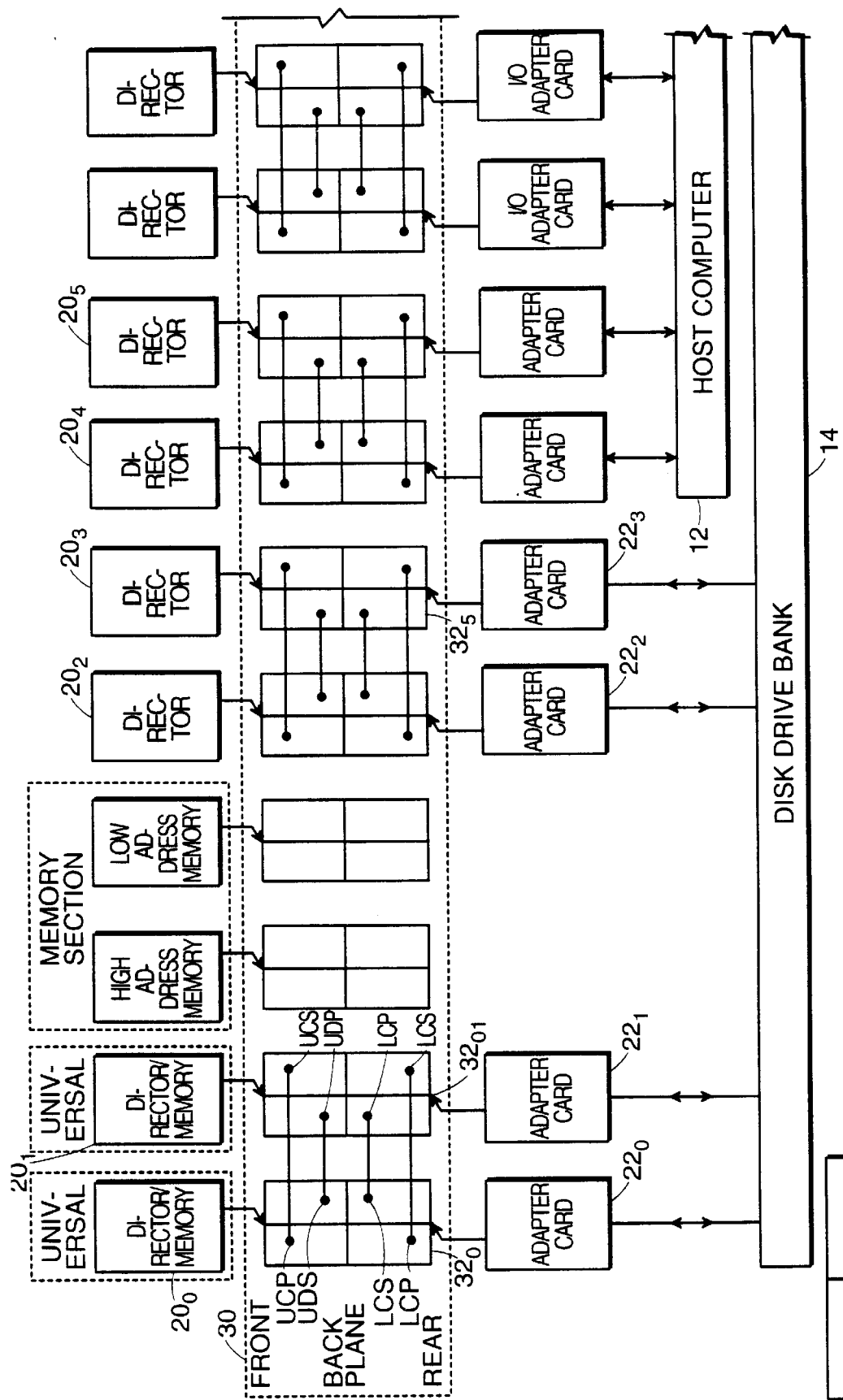
FIG. 9 is a diagram showing a layout of the data storage system of FIG. 1 and the backplane interconnections made between the SCSI I/O interfaces of adjacent ones of the directors.
Figure 9B:
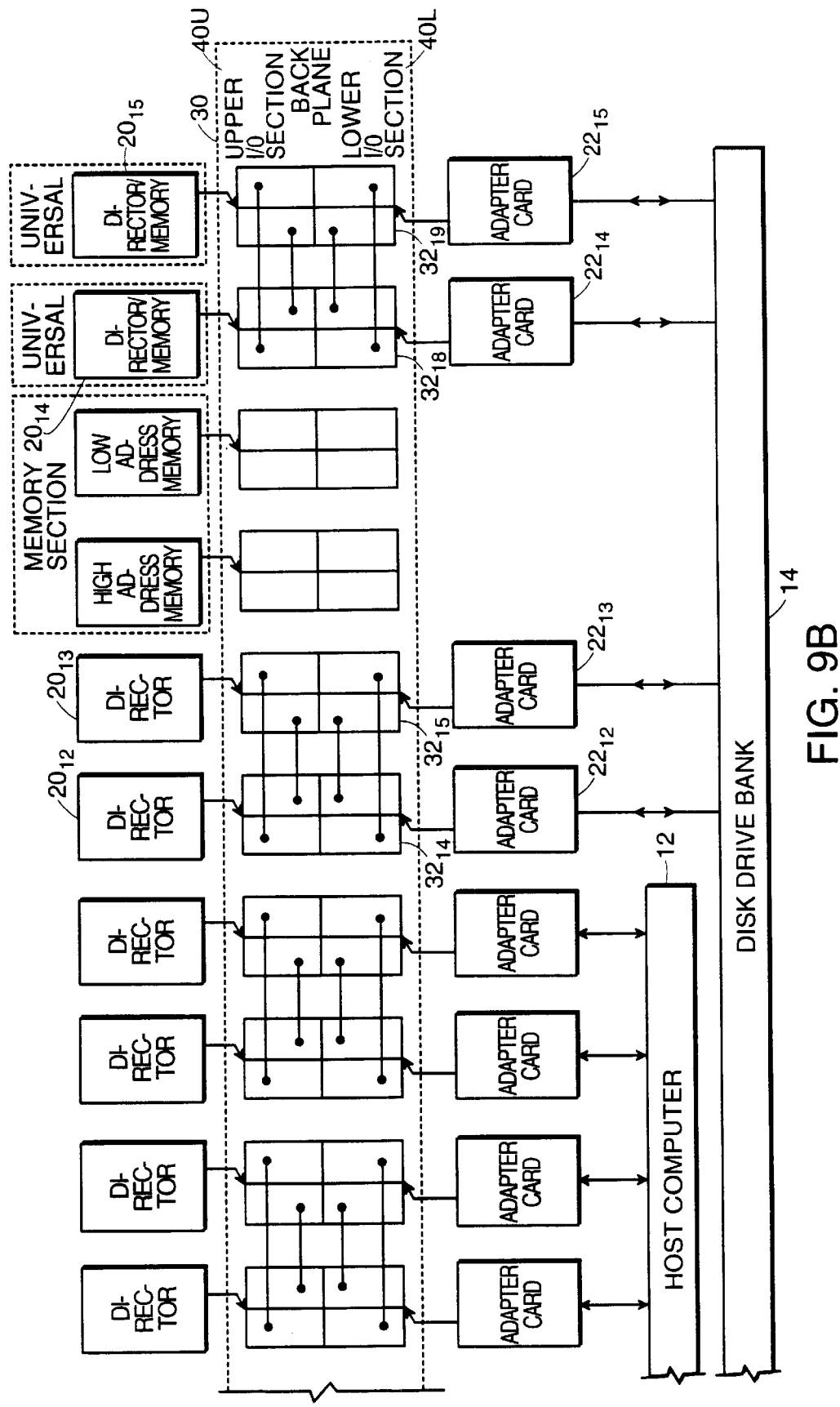

With a SCSI interface, as shown in FIGS. 8 and 9, each one of the input/output interfaces 52, 54 includes a primary SCSI initiator section and a secondary, or redundant (i.e.. "back-up") SCSI initiator section. The primary SCSI initiator section includes four identical SCSI initiator chips: LDP, LCP, UDP, and UCP, as indicated, each adapted to initiate, or start, a transfer to a target, or destination, according to SCSI protocol. The secondary SCSI initiator section also includes four identical SCSI initiator chips: LDS, LCS, UDS, and UCS, as indicated, each adapted to initiate, or start, a transfer to a target, or destination, according to the SCSI protocol.

Here, a SCSI transfer uses a of SCSI initiator. Thus, the CPU Y of a director is coupled to the primary LDP and LCP chips of the director and the primary UDP and UCP chips of the director are coupled to the X CPU section of such director. For redundancy, the CPU X of a director is coupled to the secondary UDS and UCS chips of the director, and the secondary LDS and LCS chips of the director are coupled to the Y CPU section of such director. As noted in connection with FIG. 5, the X and Y CPU sections are coupled to busses TH and BL or to the busses BH and TL depending on the slot used by the director.

Thus, referring to FIG. 9, for an exemplary pair of adjacent electrical connectors $32_0$, $32_1$, as noted above, the UCP pins of electrical connector 320 are connected the UCS pins of electrical connector $32_1$ through printed wires in the layers of the backplane printed circuit board 30. The UCS pins of electrical connector $32_0$ are connected the UCP pins of electrical connector $32_1$ through printed wires in the layers of the backplane printed circuit board 30. The LCP pins of electrical connector $32_0$ are connected the LCS pins of electrical connector $32_1$ through printed wires in the layers of the backplane printed circuit board 30. The LCS pins of electrical connector $32_0$ are connected the LCP pins of electrical connector $32_1$ through printed wires in the layers of the backplane printed circuit board 30. As noted particularly from FIG. 9, this arrangement is used for the rear-end directors connected to the bank 14 of disk drives and to the universal connectors $32_0$, $32_1$, $32_{14}$ and $32_{15}$ which, as noted above, are adapted to receive directors $20_1$, $20_2$, $20_{14}$ and $20_{15}$, respectively. It is noted that these pins LDP, LCP, UDP, UCP, LDS, LCS, UDS, UCS, are interconnected between adjacent directors other that for those in the universal connectors for enabling a degree of freedom in configuration, i.e., the electrical connectors for directors $20_4$, $20_5$, enables such directors to be connected to the bank of disk drives instead of to the host computer.

Vref Generator/Receiver

Figure 10:
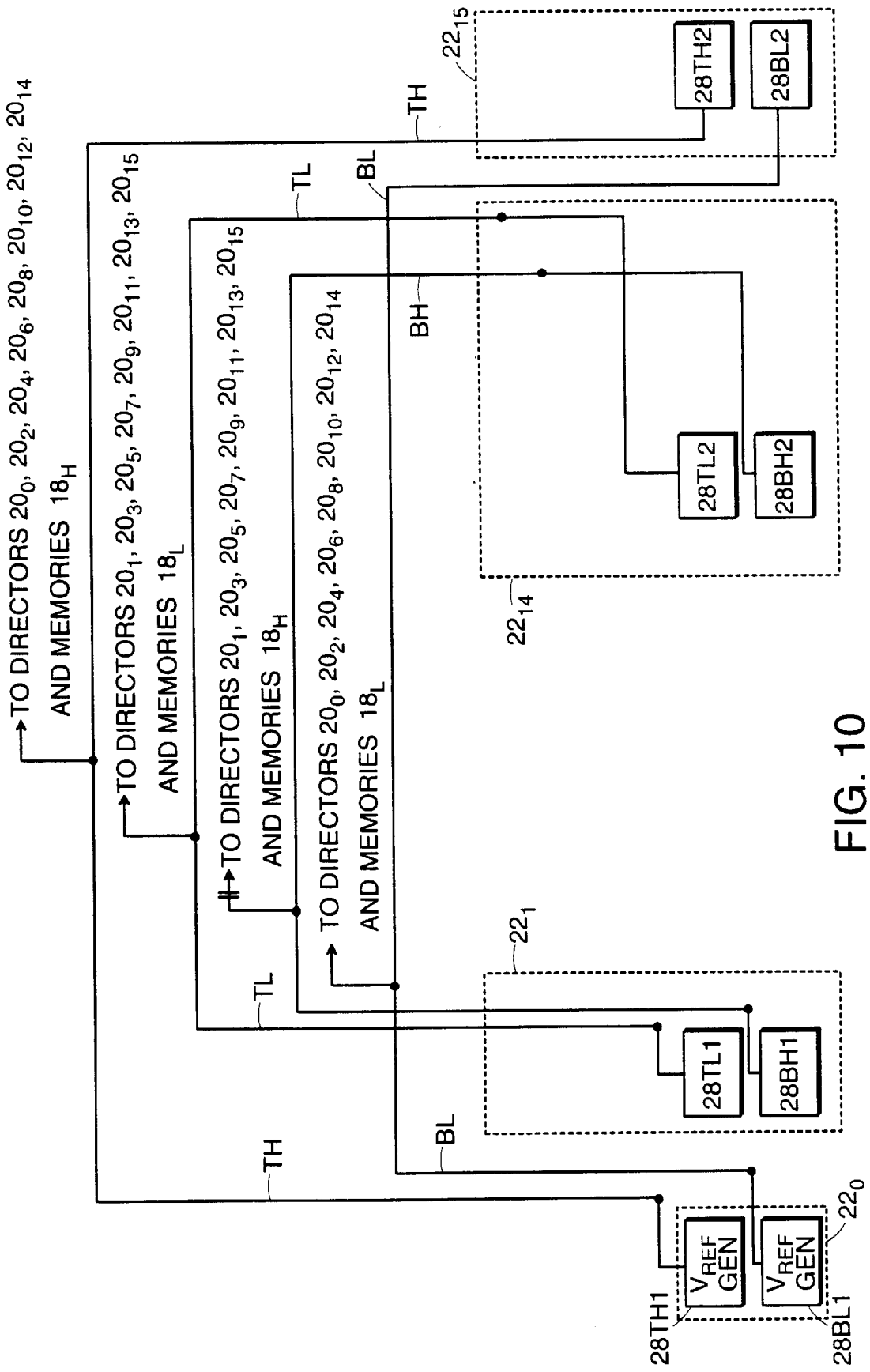
FIG. 10 is a schematic diagram showing Vref generators used in the system of FIG. 1 and interconnected in accordance with the invention.
Figure 12B:
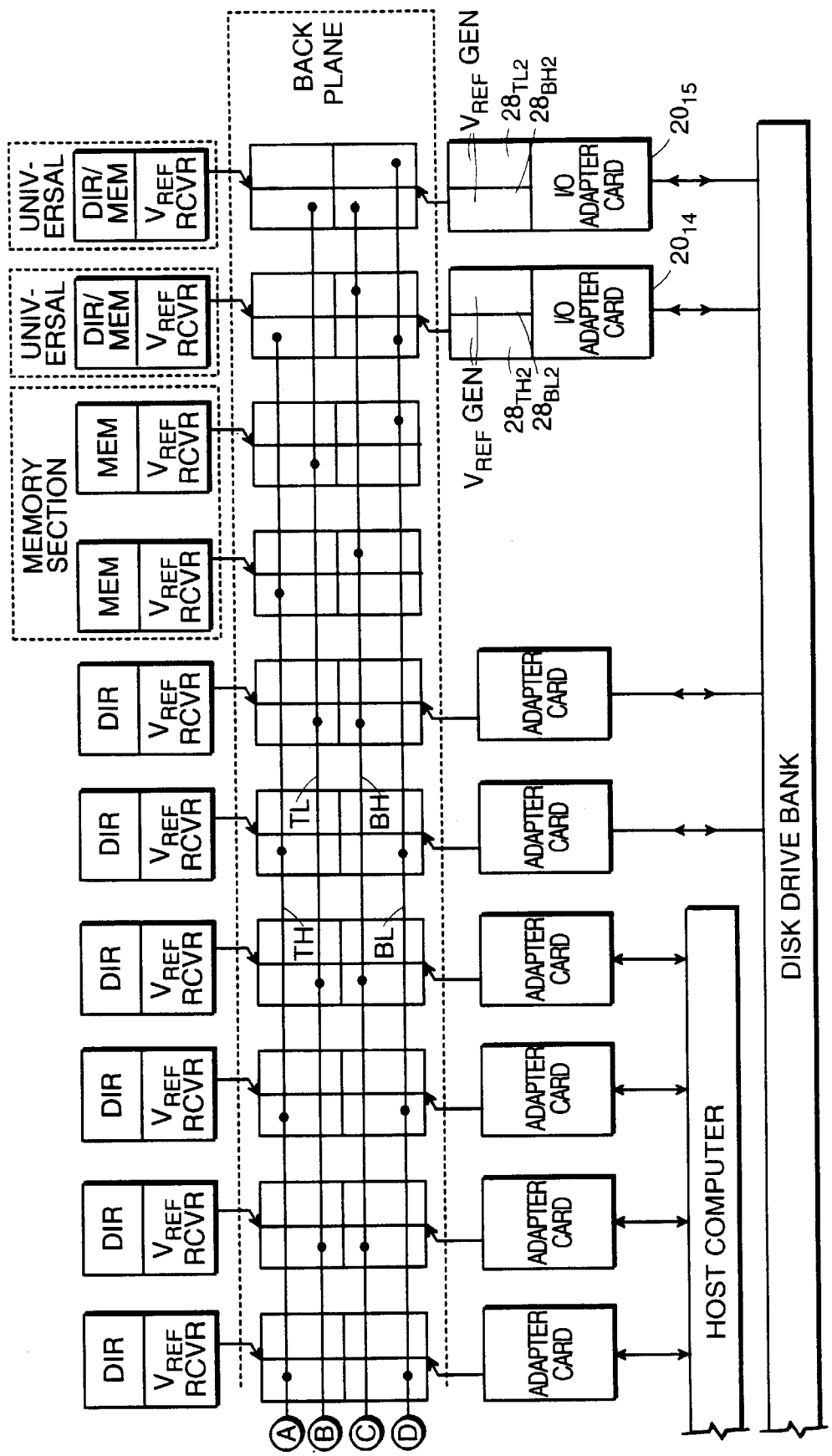
FIG. 12 is a diagram showing a layout of the data storage system of FIG. 1 and the Vref generators of FIG. 11.

The system 10 (FIG. 1) has a plurality of reference voltage (Vref) generators 28TH1, 28TH2; 28TL1, 28TL2;

28BH1, 28BH2; 28BL1, 28BL2, arranged as shown in FIGS. 10 and 12. These reference voltage generators are used to supply a reference voltage, Vref=1.0 volts, for Gunning Transistor Logic Plus (GTLP) used in interfaces 56 and 58 (FIG. 5) used in the directors and GTLP circuitry in the memories 18H, 18L. Each bus couples the generated reference voltage to each one of the directors electrically connected to such bus, as shown in FIG. 10. Each one of the directors electrically connected to the bus includes, as described above in connection with FIGS. 5, 5A and 6, a reference voltage receiver response to the generated reference voltage for distributing the generated reference voltage among electrical components in such director. Thus, as noted above, the rear-end directors include a Vref receiver 60 for receiving generated Vref voltage transmitted to the receivers 60 on the high and low address memory busses, e.g., TH and BL, and for distributing such received voltages to the interface sections 56 and 58. As noted above, an exemplary one of the receivers 60 is shown in FIG. 5A to include a high input impedance operation amplifier 64 having the non-inverting input thereof fed by the Vref voltages on the memory busses. The output of the amplifier 64 is coupled to the inverting input thereof and provides the local reference voltage Vref for the interfaces 56 and 58.

It is noted that Vref receiver 60 is also in the front-end directors and the high address memories 18H and the low address memories 18L. Thus, rather that merely transmit Vref voltages on the busses and having resistor dividers in the directors and memories, receiver 60 is used with high input impedance operational amplifier 64 (FIG. 5A) to minimize the amount of current on the bus, and therefore the associated voltage drop along the bus, and to reduce the effect of change in the value of the resistors in the resistor divider network and its associated adverse effect on the accuracy of the Vref used by the GTLP circuits in the directors and memories.

Figure 11:
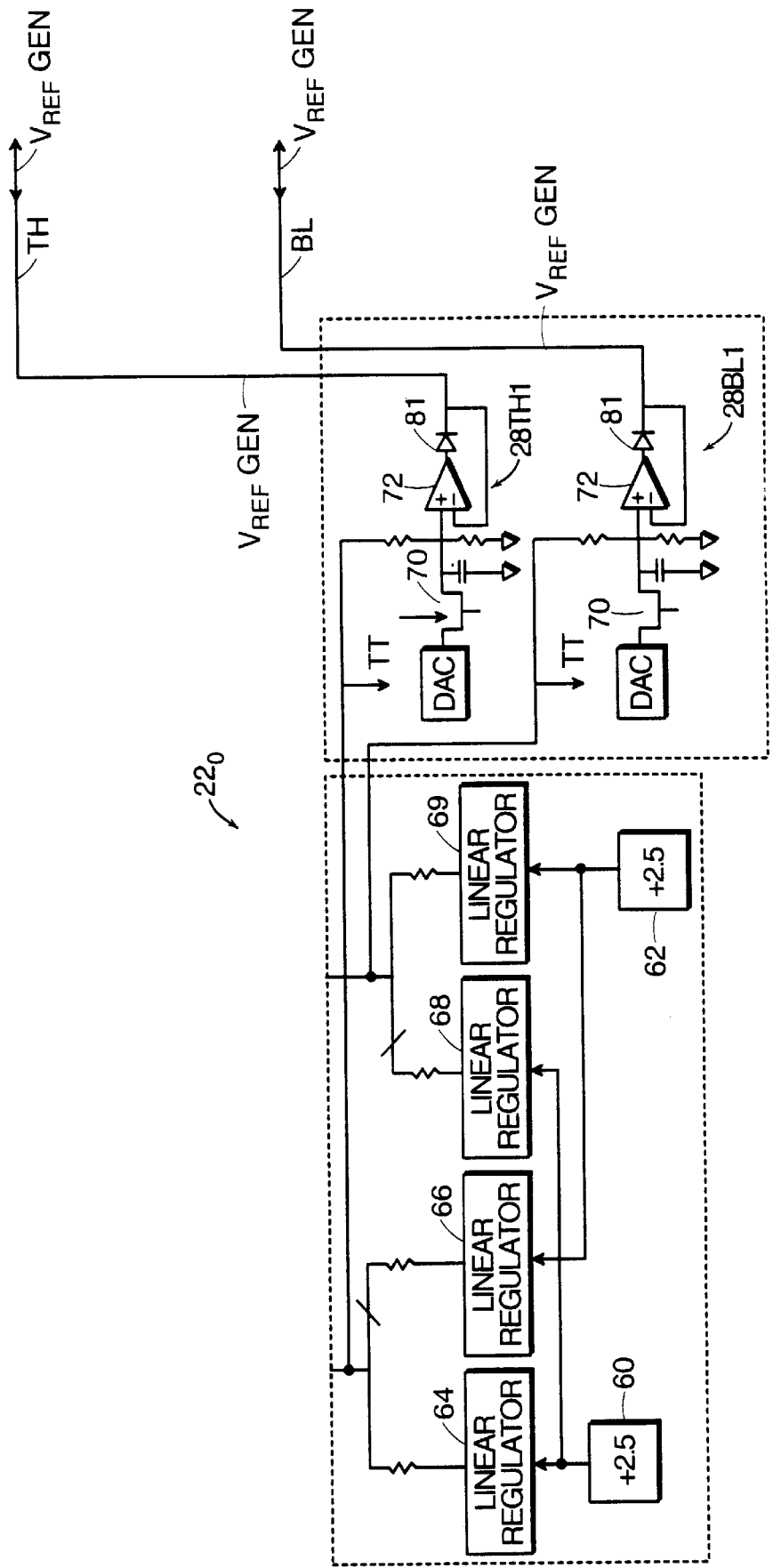
FIG. 11 is a schematic diagram of the Vref generator of FIG. 1, such generator being on one of the I/O adapter cards used in the system of FIG. 1.

Referring also to FIGS. 11 and 12, it is noted that the generators 28TH1, 28TH2; 28TL1, 28TL2; 28BH1, 28BH2; 28BL1, 28BL2 are connected to the terminating ends of the bus and are disposed on the adapter cards $20_0$, $20_1$, $20_{14}$ and $20_{15}$ in the electrical connectors $32_0$, $32_1$, $32_{18}$ and $32_{19}$, respectively. It is also noted that both directors and memories include a Vref receiver 60. Each one of the reference voltage generators is identical in construction. An exemplary pair of the reference voltage generators (28TH1 and 28BL1) is shown in FIG. 11. A Vtt generator includes a pair of reference supply voltage sources 60, 62, here a +2.5 voltage supply, and four linear voltage regulators 64, 66, 68 and 69, one pair of the four linear voltage regulators 64, 68 being supplied by one of the two reference voltage sources 60 and the other pair of the four linear voltage regulators 66, 69 being supplied by the other one of the two reference voltage sources 62, as shown. The outputs of a pair of the linear regulators 64, 66 are connected together (through resistors, as shown) for redundancy to provide a Vtt generated voltage which is coupled to the Vref generator 28TH1, as shown. The outputs of other pair of the linear regulators 68, 69 are connected together (through resistors, as shown) for redundancy to provide a Vtt generated voltage which is coupled to the Vref generator 28TH2, as shown. An exemplary pair of the Vref generators 28TH1. 28BL1 are shown to include a pair of digital to analog converters (DACs) coupled via switches 70 to inputs of a high input impedance operational amplifier 72, as shown. The output of the amplifiers 72 is coupled to the input thereof in a negative feedback relationship and produces the generated Vref for the top high address memory bus, TH, as shown in FIG. 11.

The DACs enable one to vary the level of the reference voltage to, for example, determine the margin allowable by the system and/or to choose an optimum Vref level for the system. This is enabled by placing a digital word to the DAC and coupling the corresponding analog voltage level through an activated switch to the non-inverting input of the operational amplifier.

It is noted that diodes 81 are isolation diodes. Thus, the one of the Vref generators 28TH1, 28TH2 which produces the higher voltage supplies the bus with such voltage. It both Vref generators 28TH1, 28TH2 produce the same voltage, they current share. Further, the diodes 81 provide isolation if one of the Vref generators 28TH1, 28TH2 fails.

Figure 11A:
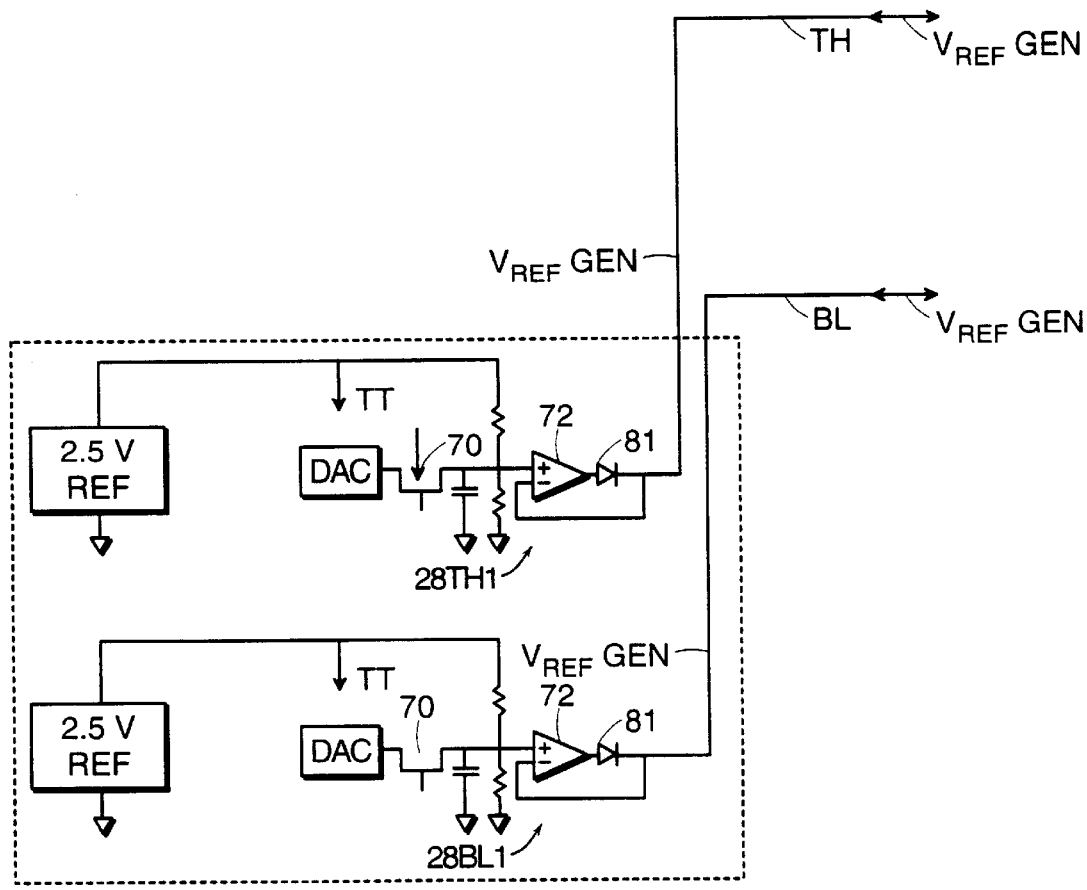
FIG. 11A is a schematic diagram of an alternative Vref generator of FIG. 1; such generator being on one of the I/O adapter cards used in the system of FIG. 1.

Alternatively, the reference voltage generators may include 2.5 volt fixed reference voltage sources arranged as shown in FIG. 11A to provide the Vtt generator.

Arbiter

Figure 13:
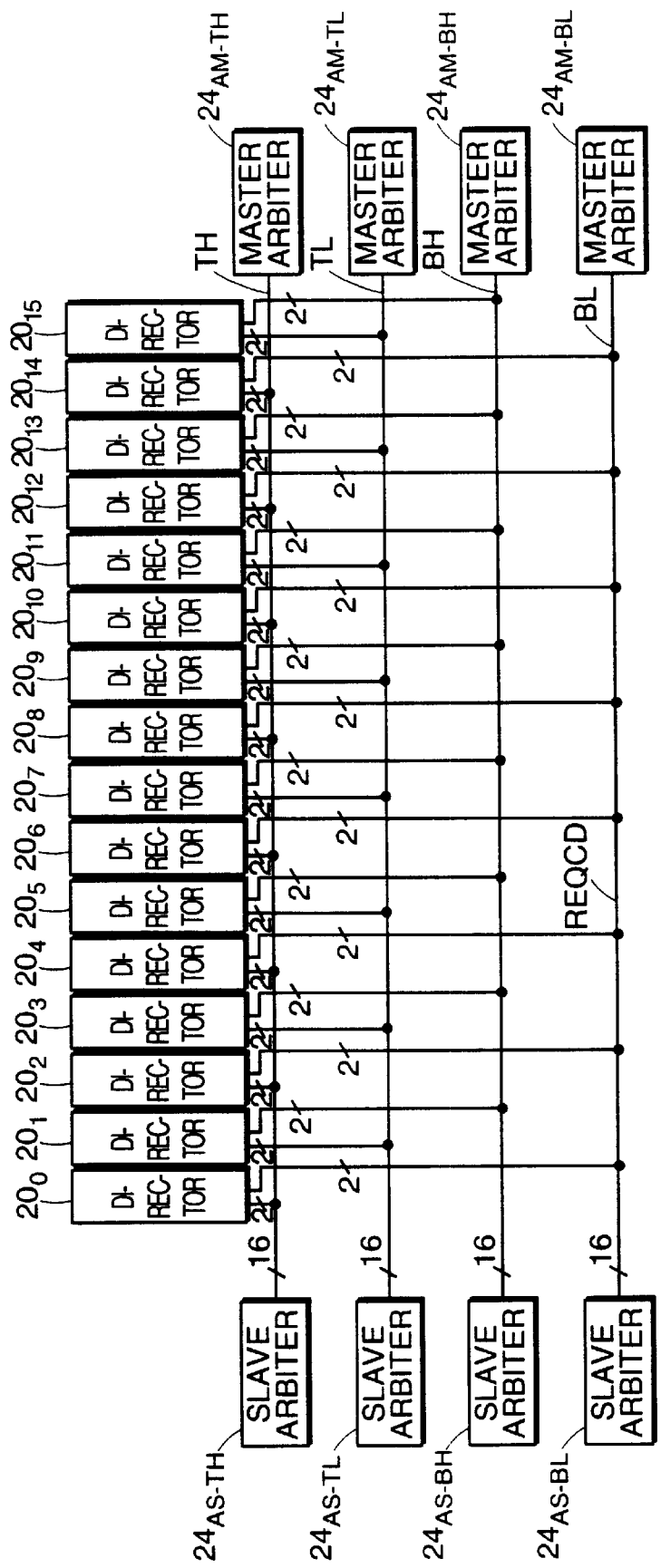
FIG. 13 is a schematic diagram showing connections between directors of the system of FIG. 1 and bus arbiters in such system according to the invention.

Referring again to FIG. 1, as noted above, a plurality of pairs of master and slave bus arbiters $24_{AM\_TH}$, $24_{AS\_TH}$; $24_{AM\_TL}$, $24_{AS\_TL}$, $24_{AM\_BH}$, $24_{AS\_BH}$; $24_{AM\_BL}$, $24_{AS\_BL}$ is provided. Referring also to FIG. 13, requests for one of the busses TH, TL, BH, BL are made by the eight directors connected to such one of the busses. Thus, for exemplary bus BL, requests for bus BL may be made by the eight directors $20_0$, $20_2$, $20_4$, $20_6$, $20_8$, $20_{10}$, $20_{12}$ and $20_{14}$ connected to such bus BL. A pair of arbiters $24_{AS\_BL}$ and $24_{AM\_BL}$ is connected to the ends of bus BL. One of each of the pairs of bus arbiters is a master arbiter, here arbiter $24_{AM\_BL}$ and the other one of the pair of arbiters is a slave arbiter, here $24_{AS\_BL}$. The master arbiter $24_{AM\_BL}$ provides arbitration between directors connected to the bus BL and, if one of the directors connected to such bus BL indicates a fault, the master arbiter $24_{AM\_BL}$ is disabled and the slave arbiter $24_{AS\_BL}$ is enable to provide such arbitration. More particularly, the I/O adapter cards $22_0$, $22_{14}$ connected to the terminating ends of the bus BL received in end ones of the electrical connectors $32_0$, $32_{19}$, respectively, have thereon the slave arbiter $24_{AS\_BL}$ and master arbiter $24_{AM\_BL}$, respectively, electrically connected to bus BL. (Referring to FIG. 2, it is noted that I/O adapter card $22_0$ has slave arbiters $24_{AS\_TH}$ and $24_{AS\_BL}$; I/O adapter card $22_1$ has slave arbiters $24_{AS\_BH}$ and $24_{AS\_TL}$; I/O adapter card $22_{14}$ has master arbiters $24_{AM\_TH}$ and $24_{AM\_BL}$; and, I/O adapter card $22_{15}$ has master arbiters $24_{AM\_BH}$ and $24_{AM\_TL}$). Each one of the arbiters $24_{AM\_BL}$ or $24_{AS\_BL}$ is identical in construction and is adapted to respond to the priority codes of the directors coupled thereto and assign access to such bus in accordance with a predetermined criteria, to be described.

Figure 15:
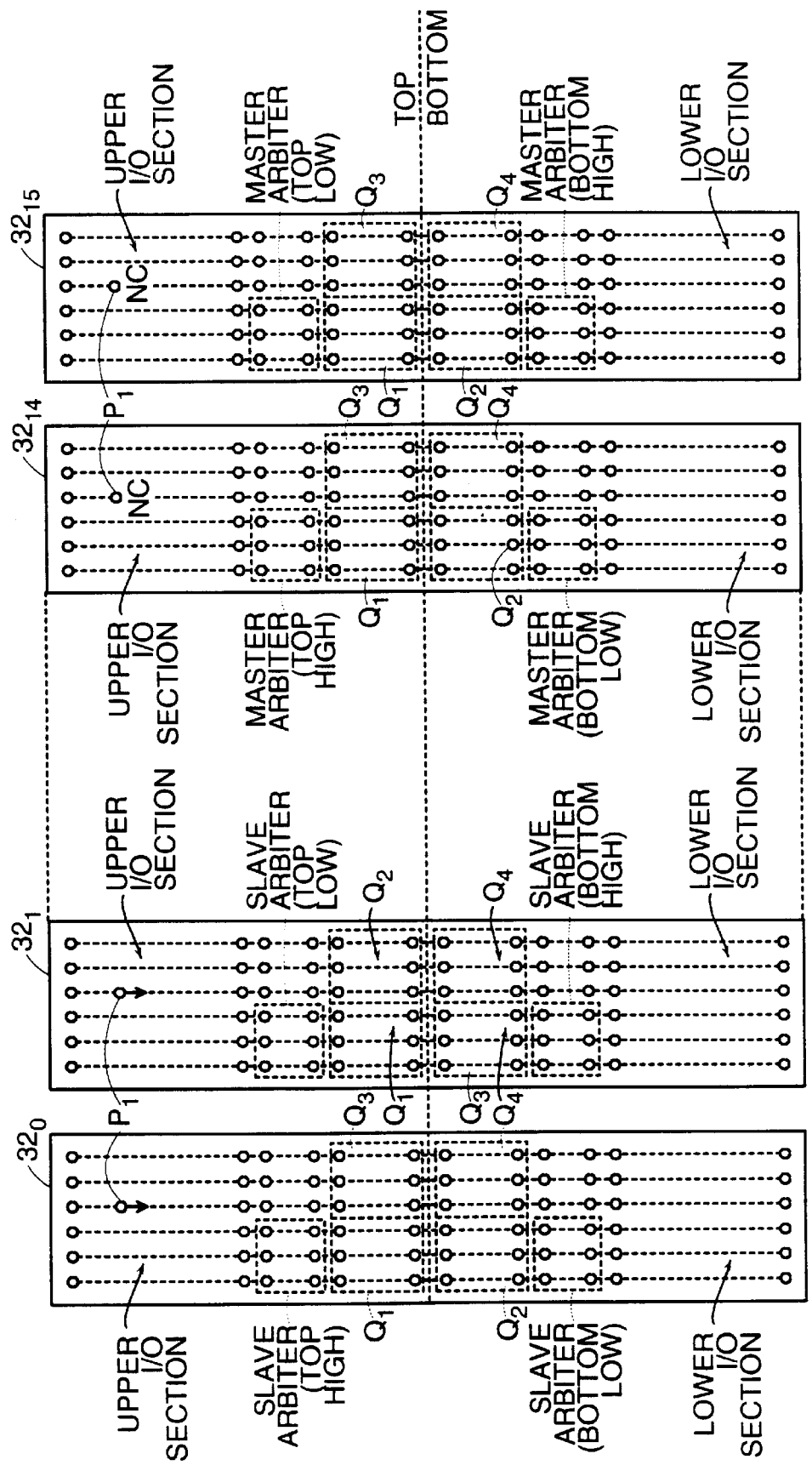
FIG. 15 is a diagrammatical sketch of a portion of the backplane of FIG. 3, such sketch showing pin connections to configure one of the arbiters in FIG. 14 as the master arbiter and the other one of the arbiters as the slave arbiter.

Referring to FIG. 15, it is noted that electrical pins $P_1$ have the same physical location in each one of the electrical connectors $32_0$, $32_1$, $32_{18}$ and $32_{19}$. Further, it is noted that the pins $P_1$ in electrical connectors $32_0$ and $32_1$ are connected to ground via the ground plane of the backplane printed circuit board while the pins $P_1$ in the electrical connector $32_{14}$ and $32_{15}$ are not connected; i.e., are open circuit, that is, are terminated in a high impedance. Thus, one of the electrical connectors $32_0$, $32_{18}$ at one end of the bus BL, here connector $32_{18}$ has a reference electrical potential on pin $P_1$ thereof, here ground, and the one of the electrical connectors $32_0$ at the other end of the bus has a high impedance on pin $P_1$ thereof, here an open circuit (i.e, no connection, NC). The, mating pins $P_1$ in the I/O adapter card received in electrical connectors $32_0$, $32_1$ are therefore connected to the grounded pins, while the mating pins $P_1$ in the I/O adapter card received in electrical connectors $32_{18}$, $32_{19}$ are therefore connected to an open circuit. Plugging an adapter card in electrical connectors $32_0$ and $32_1$ configures the arbiter thereon into a slave arbiter while plugging the same adapter card into electrical connector $32_{18}$, $22_{19}$ configures the same arbiter as a slave arbiter.

Figure 14:
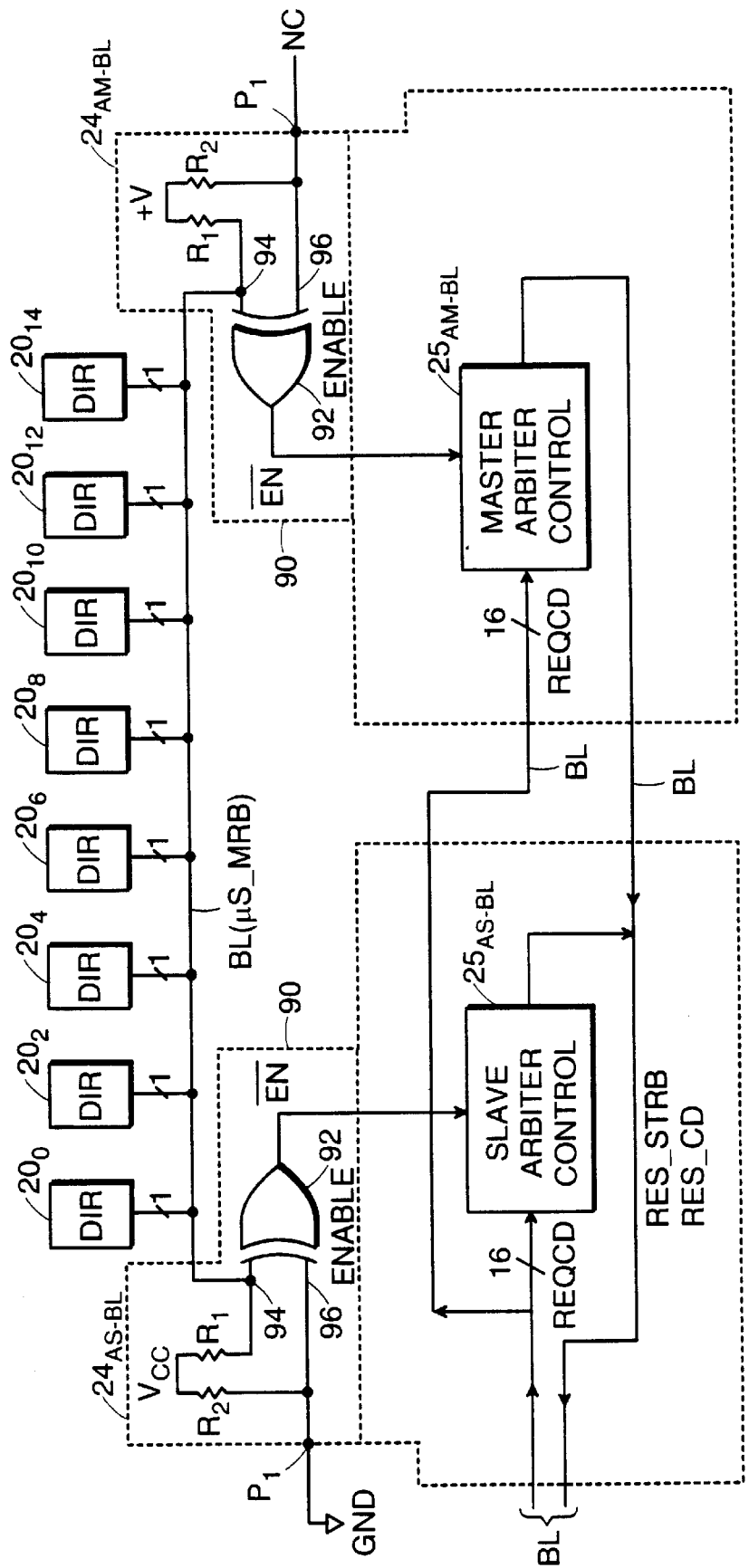
FIG. 14 is a schematic diagram of a master and slave arbiter connected to one of a plurality of busses used in the system of FIG. 1 and connected to a plurality of directors used in such system, such arbiters being adapted to arbitrate between requests for access to the bus by such directors.

More particularly, referring also to FIG. 14, it is noted that, and considering the exemplary master and slave arbiters connected to the ends of bus BL, the master arbiter $24_{AM\_BL}$ has identical circuitry as the slave arbiter $24_{AS\_BL}$. Thus, each includes identical master/slave arbiter enable circuits 90 and identical master and slave arbiter control circuitry $25_{AM\_BL}$, $25_{AS\_BL}$, respectively. The master/slave arbiter enable circuits 90 each include an exclusive OR gate 92 having a pair of inputs 94, 96. One of the pair of inputs, here input 94, is connected to a supply voltage, Vcc, through a resistor $R_1$ and to the directors connected to the bus BL via a one bit line MS_ARB, while the other input 96 is connected to pin $P_1$ and to Vcc through resistor $R_2$ to the directors connected to the bus BL. As noted above, when pin $P_1$ is connected to ground, as when the adapter card is plugged into electrical connector $32_0$, the arbiter will be configured as a slave arbiter $24_{AS\_BL}$ while when the same adapter card is plugged into electrical connector $32_{18}$, the arbiter will be configured as a master arbiter $24_{AM\_BL}$. The resulting configuration for an exemplary one of the busses, here bus BL, is shown in FIG. 14.

At power-up, a high logic signal is produced on the one bit MS_ARB line (FIG. 14). The high logic level signal on the one bit MS_ARB line is fed to inputs 94 of both master/slave arbiter enable circuits 90. In response to the high logic level, the exclusive OR gate 92 of master arbiter $24_{AM\_BL}$ produces a low enable signal to thereby enable the master arbiter control $25_{AM\_BL}$ and exclusive OR gate 92 of slave arbiter $24_{AS\_BL}$ produces a high enable signal to thereby disable slave arbiter $25_{AS\_BL}$. If a director issues a two bit priority code and no response is received by the arbiter after a predetermined time, the same director which issued the priority code for the bus produces a low logic signal to inputs 94 of both master/slave arbiter enable circuits 90. More particularly, if a director requests the bus, and a bus grant is not received within a predetermined time, for example, 150 milliseconds, the director detects an arbitration timeout error, assumes that the master arbiter has failed, and produces a low logic level on the one bit MS_ARB line (FIG. 14). In response to the low logic level, the exclusive OR gate 92 in the slave arbiter $24_{AS\_BL}$ produces a low enable signal to thereby enable the slave arbiter control $25_{AS\_BL}$ and the exclusive OR gate 92 in the master arbiter $24_{AM\_BL}$ produces a high enable signal to thereby disable the master arbiter control $25_{AM\_BL}$.

As noted above, each one of the directors is adapted to produce on the bus BL coupled thereto a plural, here two-bit priority code REQCD. The bus arbiter $24_{AM\_BL}$, for example, is responsive to the priority codes of the directors coupled thereto and assigns access to such bus in accordance with a predetermined criteria. Here, the two-bit priority code REQCD provides one of three levels of priority: a low priority and two types of high priority; i.e., a DMA high priority and a DSA high priority. (A DMA high priority is used for a read/write multiple data word transfer while a DSA high priority is used for a read/write single data word transfer). The arbiter assigns the lowest priority to the directors issuing the low priority code and toggles alternatively between directors issuing either one of the two high priority requests in a manner to be described. In any event, a low priority request is granted by the arbiter to a director which has been issuing such request for a predetermined number of director requests.

Figure 16:
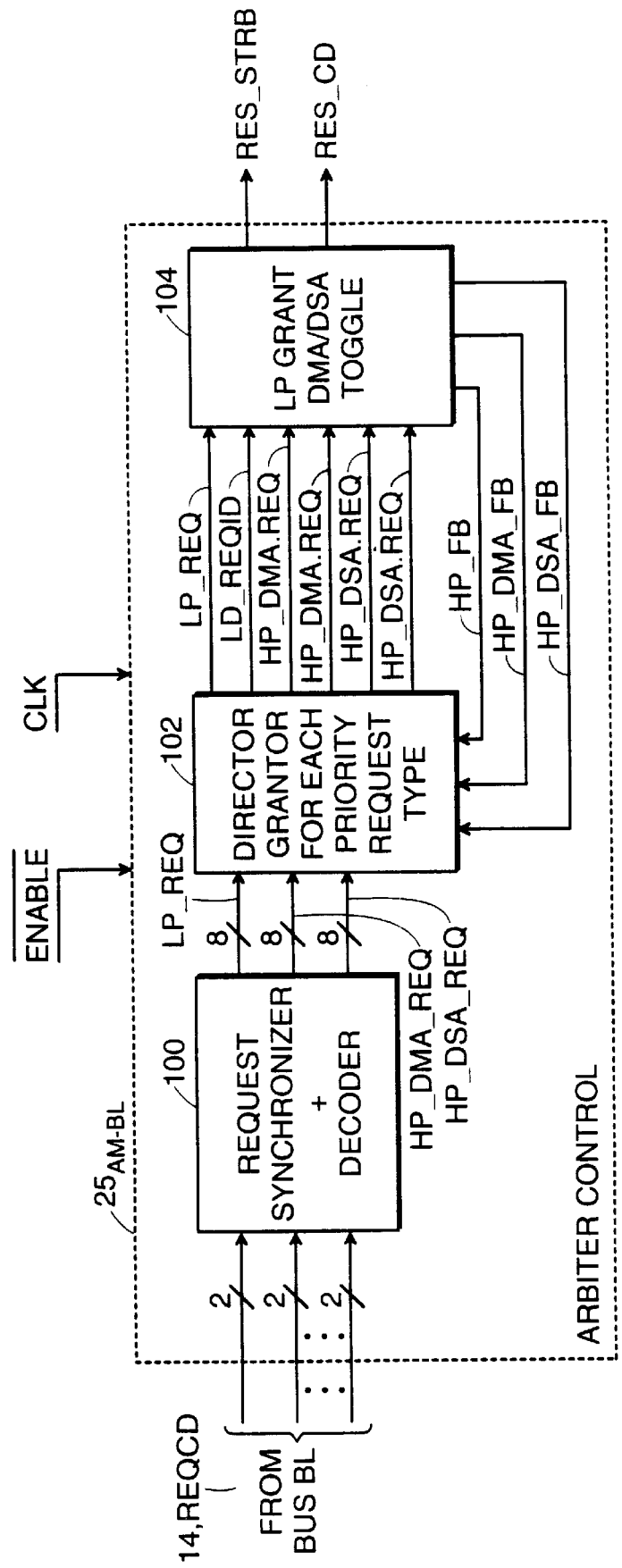
FIG. 16 is a block diagram of an exemplary one of the arbiters of FIG. 14 according to the invention.

Referring now to FIG. 16, an exemplary one of the arbiter controls $25_{AM\_BL}$, $25_{AS\_BL}$, here arbiter control $25_{AM\_BL}$, is shown in detail. (As noted above, each of the arbiter controls $25_{AM\_BL}$, $25_{AS\_BL}$ is identical in construction.) The arbiter control $25_{AM\_BL}$ is shown to include a request synchronizer and decoder section 100, shown in more detail in FIG. 17, a director granter 102 for each of the three types of priorities, shown in more detail in FIG. 18, and a low priority/high priority toggle selector 104, shown in more detail in FIG. 19.

Figure 17:
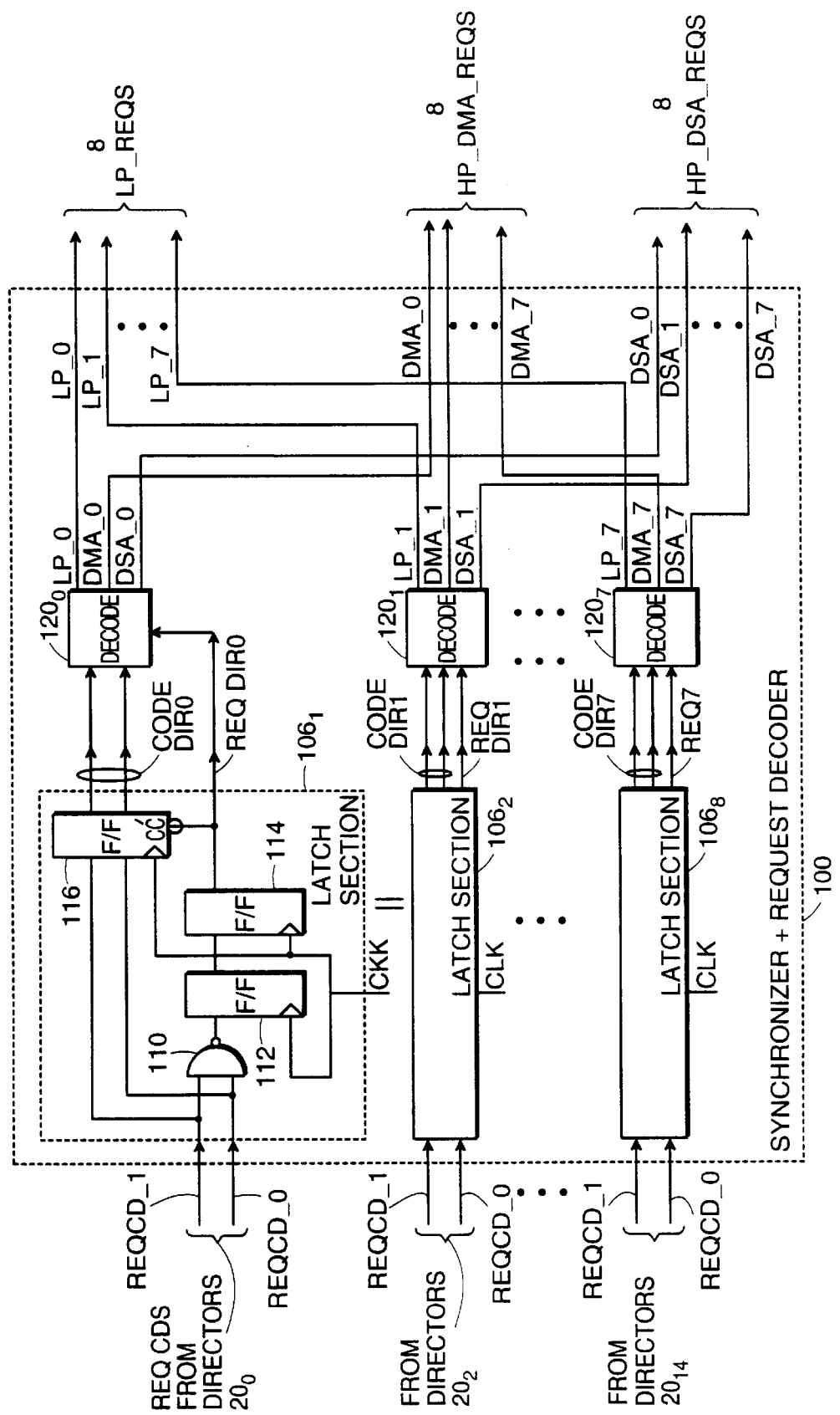
FIG. 17 is a schematic diagram of a priority request synchronizer and decoder used in the arbiter of FIG. 16.
Figure 18:
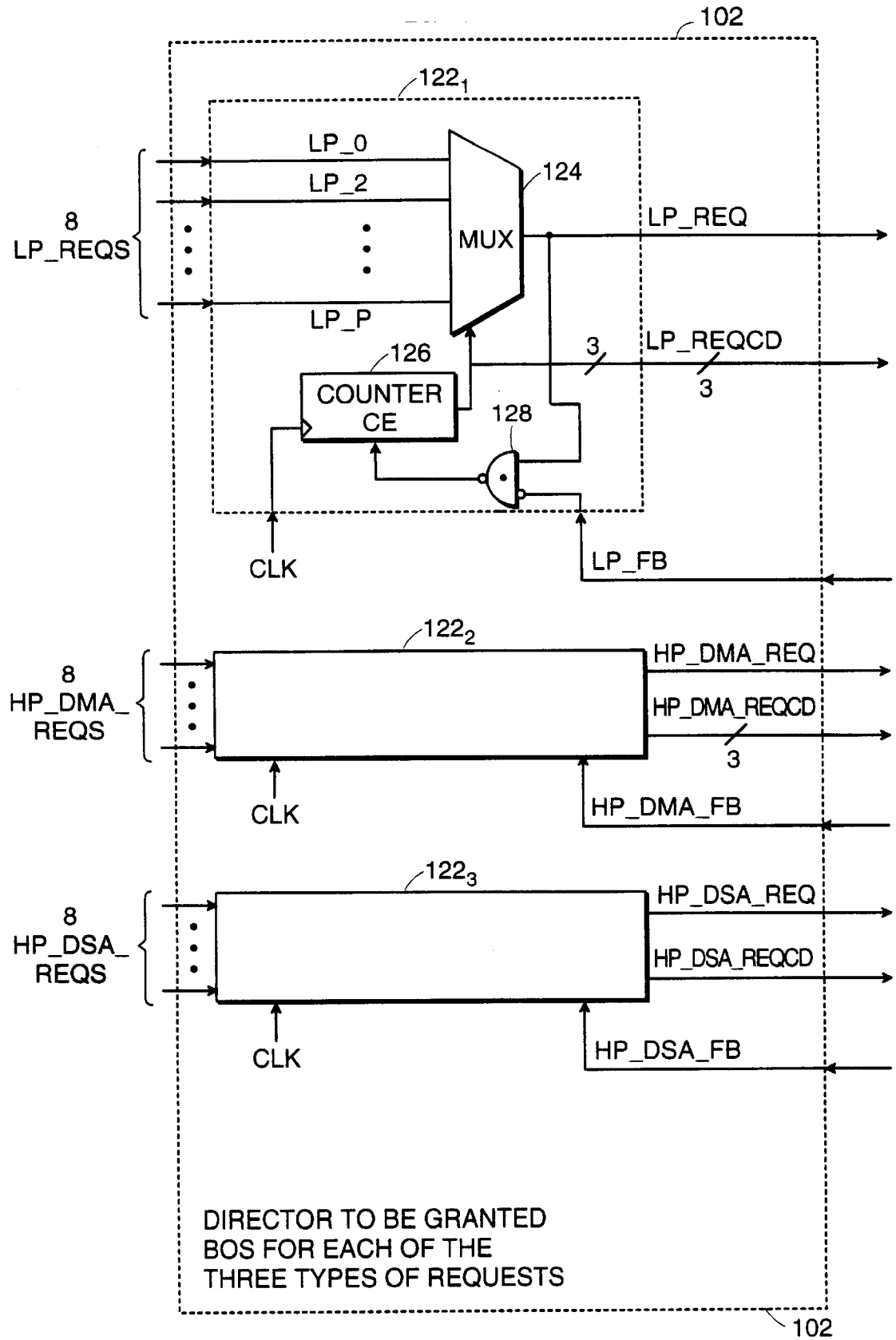
FIG. 18 is a schematic diagram of a section of the arbiter of FIG. 16 used to generate, for each one of a plurality of priority request types issued by the directors, a director grant.

Referring to FIG. 17, the request synchronizer and decoder section 100 is used to first synchronize the asynchronous two-bit priority requests (REQCDs) from the eight directors $20_0$, $20_2$, $20_4$, $20_6$, $20_8$, $20_{10}$, $20_{12}$, to a clock, CLK. The request synchronizer and decoder section 100 includes a plurality of here eight synchronization latching sections $106_1$–$106_8$, each one thereof being fed by the two-bit priority code of a corresponding one of the eight directors $20_0$, $20_2$, $20_4$, $20_6$, $20_8$, $20_{10}$, $20_{12}$ coupled to the arbiter control $25_{AM\_BL}$. Here, the two-bit priority codes REQCDs (i.e., one bit being REQCD_0 and the other bit being REQCD_1) are represented by binary logic signals as follows:

TABLE I

| REQCD_0 | REQCD_1 | Priority Request Type |
|---|---|---|
| 0 | 0 | Low Priority |
| 0 | 1 | High Priority_DMA |
| 1 | 0 | High Priority_DSA |
| 1 | 1 | No Request |

Each one of eight synchronization latching sections $106_1$–$106_8$ is identical in construction. An exemplary one thereof, here section $106_1$, is shown to include an NAND gate 110 fed by the two-bit priority code of the one of the eight directors, here director $20_0$ fed thereto. Also provided are three flip/flop (F/F) sections 112, 114, 116 arranged as shown having their clock terminals fed by the CLK. Thus, after a clock pulse CLK, the two-bit priority code of the director issuing such code since the last clock CLK are stored in the flip/flop 116. The flip/flop 114 produces a logic signal on line REQ DIR0 to indicate that a valid code has been detected.

The outputs of the here eight synchronization latching sections $106_0$–$106_7$ are fed to a corresponding one of here eight decoders $120_0$–$120_7$ to decode the two-bit word fed thereto to one of the three priority levels; i.e., low priority, high priority$_{13}$ DMA; or high priority$_{13}$ DSA in response to the logic signal on line REQ DIR0 indicating that a valid code has been detected. Here, a request is represented by a logic 1 and the absence of a request is represented by a logic 0. Each one of the eight decoders $120_0$–$120_7$ produces the decoded priority request for a corresponding one of the eight directors $20_0$–$20_7$, as indicated. Thus, for example, decoder $120_0$ produces decoded priority requests $LP_{13}$ 0, $DMA_{13}$ 0, and $DSA_{13}$ 0 for director $20_0$ and decoder $120_7$ produces decoded priority requests $LP_{13}$ 7, $DMA_{13}$ 7, and $DSA_{13}$ 7 for director $20_7$. The three priority requests are grouped as indicated for each of the eight directors $20_0$, $20_2$, $20_4$, $20_6$, $20_8$, $20_{10}$, $20_{12}$, $20_{14}$ into a low priority set of eight $LP_{13}$ REQS request (i.e., $LP_{13}$ 0 through $LP_{13}$ 7, respectively, provided by decoders $120_0$–$120_7$); a set of eight first high priority set of $HP_{13}$ $DMA_{13}$ REQS requests (i.e., $DMA_{13}$ 0 through $DMA_{13}$ 7, respectively, provided by decoders $120_0$–$120_7$); and a set of eight second high priority set of $HP_{13}$ $DSA_{13}$ REQS requests (i.e., $DSA_{13}$ 0 through $DSA_{13}$ 7, respectively, provided by decoders $120_0$–$120_7$), as shown. Here, as noted above, a request is a logic 1 and the absence of a request is a logic 0. Thus, if the director $20_0$ issues a DSA request when there is a CLK, line $DSA_{13}$ 0 is a logic 1; whereas if the director $20_0$ does not issues a DSA request when there is a CLK, line $DSA_{13}$ 0 is a logic 0. In like manner, if the director $20_{14}$ issues a DSA request when there is a CLK, line $DSA_{13}$ 7 is a logic 1; whereas if the director $20_{14}$ does not issues a DSA request when there is a CLK, line DSA_7 is a logic 0.

The three sets of priority requests (i.e., a set of eight $LP_{13}$ REQS request, a set of eight $HP_{13}$ $DMA_{13}$ REQS requests; and a set of eight $HP_{13}$ $DSA_{13}$ REQS requests) are fed by the request synchronizer and decoder 100 to the director granter 102 (FIG. 18) for each of the three types of priorities. The director granter 102, for each of the three types of priorities, includes three sections $122_1$, $122_2$ and $122_3$, each of identical construction and fed by a corresponding one of the three sets of requests (i.e., the set of eight low priority requests, $LP_{13}$ REQS requests, the set of eight first type high priority requests, $HP_{13}$ $DMA_{13}$ REQS requests; and the set of eight second type high priority requests, $HP_{13}$ $DSA_{13}$ REQS requests). An exemplary one of the identical sections $122_1$, $122_2$ and $122_3$, here the section $122_1$ coupled to the set of eight LP-REQS, is shown to include an 8:1 multiplexer 124 fed by each of the eight low priority request lines LP_0 through $LP_{13}$ 7, a three bit counter 126 incremented by the clock CLK and enabled by the output of an NAND gate 128. The NAND gate 128 is fed by the output of the multiplexer 124. An inverted input of NAND gate 128 is fed by a low priority feedback signal, $LP_{13}$ FB, which indicates an active request has been granted in a manner to be described in more detail hereinafter thus releasing the polling operation of the multiplexer 124 in searching for the next active low priority request without loss of processing time. Suffice it to say here, however, that the counter 126 is enabled, (i.e., when there is a low priory request from a director and the request is not being processed), the counter 126, which is initially reset to 0, increments in response to each CLK. Thus, each time the contents of the three bit counter 116 increments, a different one of the low priority requests from the eight directors $20_0$, $20_2$, $20_4$, $20_6$, $20_8$, $20_{10}$, $20_{12}$, $20_{14}$ polled (i.e., is coupled to the output of the multiplexer 124) to provide an indication of whether the polled director produces a low priority signal on a line in the set $LP_{13}$ REQ. The count of the counter 126, (i.e., a three bit code on bus $LP_{13}$ REQCD, low priority director request code) thus indicates which one of the directors is producing the low priority request. It is noted that the low priority signal on line $LP_{13}$ REQ is produced when one of the eight directors $20_0$, $20_2$, $20_4$, $20_6$, $20_8$, $20_{10}$, $20_{12}$, $20_{14}$ is selected by the contents of the counter 126 only if such selected director produces a low priority request. Thus, when enable to increment eight times, the director granter 102, for each of the three types of priorities, has indicated the type of priority request for each of the eight directors $20_0$, $20_2$, $20_4$, $20_6$, $20_8$, $20_{10}$, $20_{12}$, $20_{14}$. That is, after eight CLKs all requests from each of the eight directors have been polled.

Figure 19:
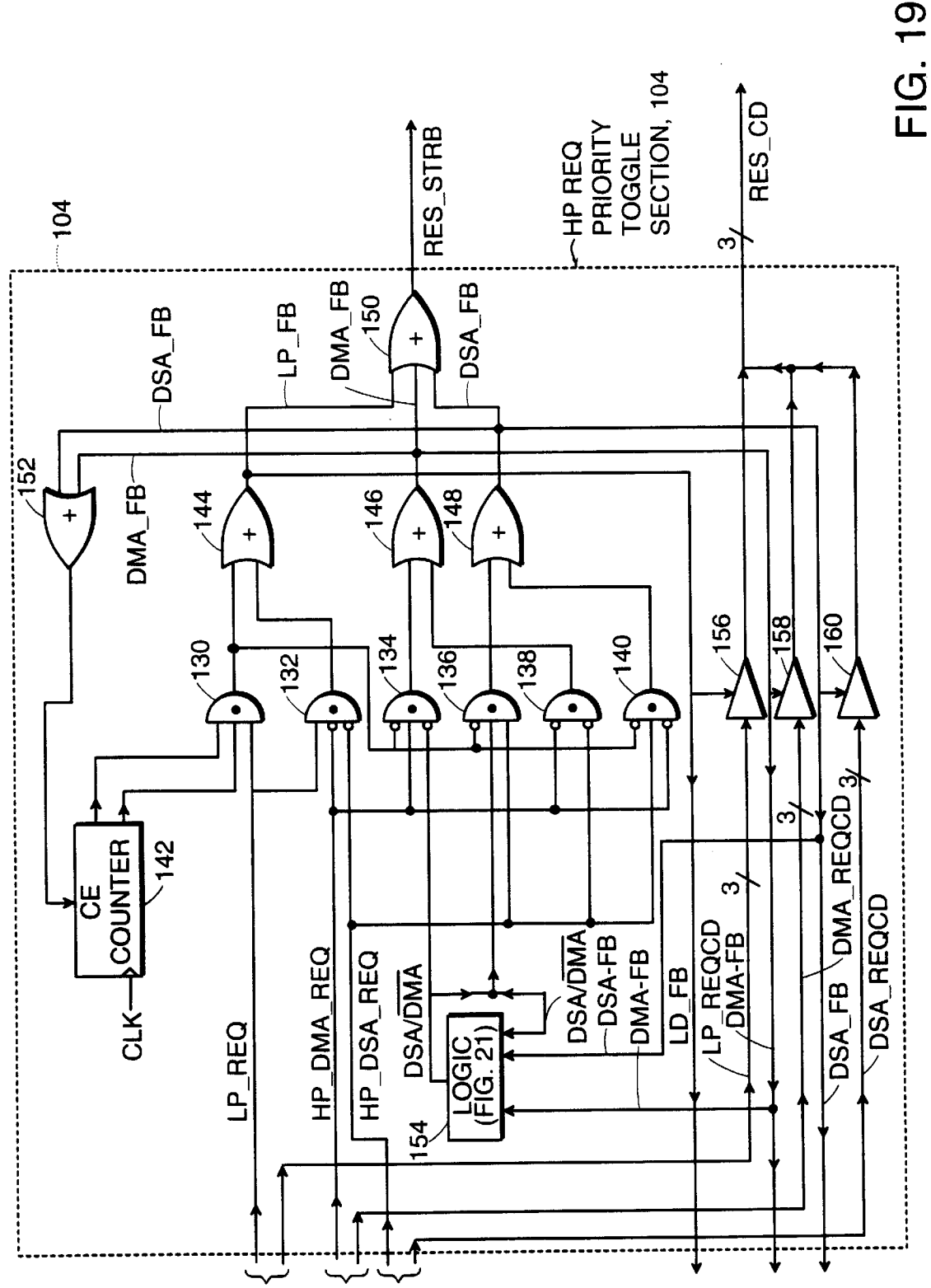
FIG. 19 is a schematic diagram of a low priority and high priority toggle section of the arbiter of FIG. 17 to insure that a low priory request is granted at least after a predetermined grants of a high priority requests and to toggle between a pair of such high priority requests.
Figure 20:
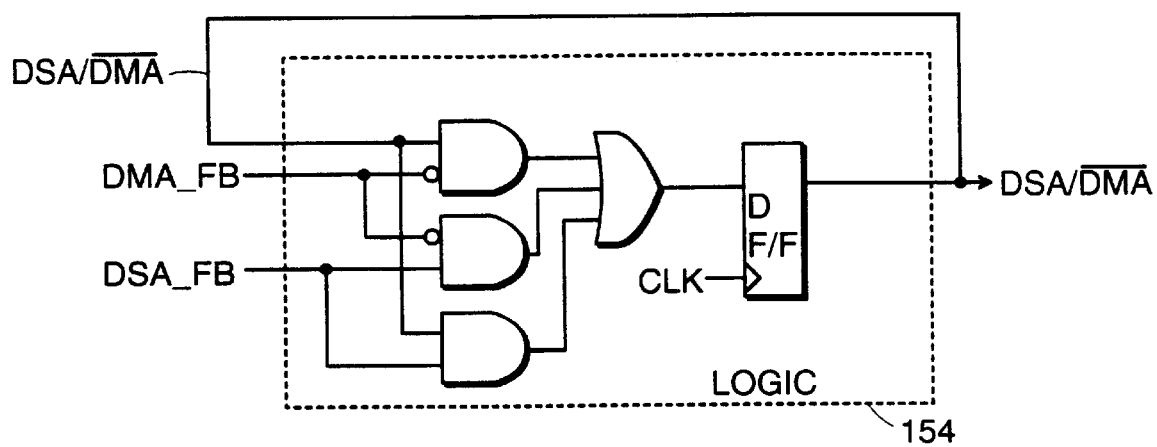
FIG. 20 is a schematic diagram of a logic section used in the toggle section of FIG. 19.

The low priority/high priority toggle selector 104 is shown in more detail in FIG. 19 to include AND gates 130 through 140, a two-bit counter 142, OR gates 144 through 152, a logic section 154 (shown in detail in FIG. 20), and gates 156 through 160, all arranged as shown. The logic section 154, shown in detail in FIG. 20, is fed by logic signals on lines $DMA_{13}$ FB, $DSA_{13}$ FB, and DSA/$\overline{DMA}$ (i.e., Previous Grant), to be described, and is arranged to implement the following priority arbitration Rules with regard to the two types of high priorities, i.e., DMA and DSA:

TABLE II

| DSA_FB | DMA_FB | Previous Grant DSA/$\overline{DMA}$ | Next Grant |
| --- | --- | --- | --- |
| no DSA request | no DMA request | previous DMA request | grant a DMA request |
| no DSA request | no DMA request | previous DSA request | grant a DSA request |
| no DSA request | DMA request | previous DMA request | grant DMA request |
| no DSA request | DMA request | previous DSA request | grant DMA request |
| DSA request | no DMA request | previous DMA request | grant DSA request |
| DSA request | no DMA request | previous DSA request | grant DSA request |
| DSA request | DMA request | previous DMA request | grant DSA request |
| DSA request | DMA request | previous DSA request | grant DMA request |

Thus, the logic network 154 implements the following logic truth Table:

TABLE III

| INPUTS | | | OUTPUT (AFTER CLK) |
| --- | --- | --- | --- |
| DSA_FB | DMA_FB | DSA/$\overline{DMA}$ | DSA/$\overline{DMA}$ |
| 0 | 0 | 0 | 0 |
| 0 | 0 | 1 | 1 |
| 0 | 1 | 0 | 0 |
| 0 | 1 | 1 | 0 |
| 1 | 0 | 0 | 1 |
| 1 | 0 | 1 | 1 |
| 1 | 1 | 0 | 1 |
| 1 | 1 | 1 | 0 |

In operation, if there is a low priority request and there had been three high priority type requests, as counted by two-bit counter 142, AND gate 130 produces a logic 1 on line $LP_{13}$ FB which passes through OR gates 144, 150 to indicate on resume strobe line RES_STRB (FIGS. 14 and 19) to all the directors to indicate that a director has been given access to the bus, BL. It is noted that the output of AND gate 130 is fed to an inverting input of AND gates 132–140 thereby causing AND gates 132–140 to produce a logic 0 when AND gate 130 produces a logic 1. Further, if there is neither a DMA or DSA request, as indicated by a logic 1 and a low priority request, a the output of AND gate 132 produces a logic 1 which passes through OR gates 144, 150 to indicate on resume strobe line $RES_{13}$ STRB (FIGS. 14 and 19) to all directors that a director has been given access to the bus, BL.

If there is a DMA request and no DSA request, AND gate 134 produces a logic 1 on line $DMA_{13}$ FB which passes through OR gates 146, 150 to indicate on the resume strobe line $RES_{13}$ STRB to the directors that a director has been given access to the bus. If there is a DSA request and no DMA request, AND gate 140 produces a logic 1 on line $DSA_{13}$ FB which passes through OR gates 148, 150 to indicate on the resume strobe line $RES_{13}$ STRB to the directors that a director has been given access to the bus. If there is a DMA request and a DSA request either AND gate 134 or AND gate 136 produces a logic 1 depending on the previous DSA or DMA request (i.e., as established by Tables II and III above).

Further, a logic 1 signal on one of the lines $LP_{13}$ FB, $DMA_{13}$ FB or $DSA_{13}$ FB enables gates 156, 158, 160, respectively, which are fed the three-bit signals $LP_{13}$ REQCD, $DMA_{13}$ REQCD and $DSA_{13}$ REQCD, to pass the three-bit director designation code on bus $RES_{13}$ CD. Thus, the signal on bus $RES_{13}$ CD provides an indication of the one of the eight directors coupled to bus BL which is being granted access to the bus BL and bus $RES_{13}$ CD provides such indication to such eight directors $20_0$, $20_2$, $20_4$, $20_6$, $20_8$, $20_{10}$, $20_{12}$, $20_{14}$.

It is noted that a director granted access to the bus after the arbitration, maintains the access to the bus as long as its request code REQCD is asserted on the bus. When the request code is removed from the bus by the director, the arbiter control $25_{AM\_BL}$, for example, produces a logic 0 on the resume strobe bus $RES_{13}$ STRB (which indicates that one of the directors has access to the bus) and the arbitration process is allowed to repeat in the manner described above. Further, as noted above, the NAND gate 128 is fed by the output of the multiplexer 124. An inverted input of NAND gate 128 is fed by a low priority feedback signal, LP_FB, which indicates an active request has been granted thus releasing the polling operation of the multiplexer 124 in searching for the next active low priority request without loss of processing time.

Other embodiments are within the spirit and scope of the appended claims. For example, backplanes may be used with a different larger or smaller number of electrical connectors than shown in FIG. 1. Further, the universal slots may located in other positions than those shown in FIG. 1.

What is claimed is:

1. A data storage system wherein a host computer is in communication with a bank of disk drives through an interface, such interface comprising:
   a memory;
   a plurality of directors for controlling data transfer between the host computer and the bank of disk drives as such data passes through the memory;
   a plurality of busses in communication with the directors and the memory;
   a plurality of bus arbiters, each pair being electrically connected to a corresponding one of the busses;
   wherein one of the pair of bus arbiters is a master arbiter and the other one of the pair of arbiters is a slave arbiter; and
   wherein the master arbiter provides arbitration between directors connected to the bus connected to the master and slave arbiter and, if one of the directors connected to such bus indicates a fault, the master arbiter is disabled and the slave arbiter is enable to provide such arbitration.

2. A data storage system wherein a host computer is in communication with a bank of disk drives through an interface, such interface comprising:
   a memory;
   a plurality of directors for controlling data transfer between the host computer and the bank of disk drives as such data passes through the memory;
   a plurality of busses in communication with the directors and the memory;
   a plurality of bus arbiters, each pair being electrically connected to ends of a corresponding one of the busses; wherein the master arbiter provides arbitration between directors connected to the bus connected to the master and slave arbiter and, if one of the directors connected to such bus indicates a fault, the master arbiter is disabled and the slave arbiter is enable to provide such arbitration.

3. The system recited in claim 2 wherein the system includes a printed circuit board having:
   the plurality of busses:
      a plurality of electrical connectors arranged in a linear array and electrically connected to the busses, such electrical connectors being adapted to receive the directors on one side of the printed circuit board and adapter cards on the other side of the printed circuit board, the director and adapter cards received in a common one of the electrical connectors being electrically connected by pins passing from one side to the other side of the printed circuit board; and
   wherein adapter cards connected to the terminating ends of the busses are received in end ones of the electrical connectors have thereon the master arbiter and slave arbiter electrically connected to such bus.

4. The system recited in claim 3 wherein one of the electrical connectors at one end of the bus has a reference electrical potential thereon and the one of the electrical connectors at the other end of the bus has a high impedance thereon.

5. A data storage system wherein a host computer is coupled to a bank of disk drives through an interface, such interface comprising:
   a memory;
   a plurality of directors for controlling data transfer between the host computer and the bank of disk drives as such data passes through the memory;
   a plurality of busses for electrically interconnecting the directors and the memory;
   wherein each one of the directors is adapted to produce on the bus coupled thereto a plural bit priority code;
   a plurality of bus arbiters, one of the arbiters being coupled to a corresponding one of the busses and responsive to the priority codes of the directors coupled thereto and for assigning access to such bus in accordance with a predetermined criteria, wherein one of the pair of bus arbiters is a master arbiter and the other one of the pair of arbiters is a slave arbiter; and wherein the master arbiter provides arbitration between directors connected to the bus connected to the master and slave arbiter and, if one of the directors connected to such bus indicates a fault, the master arbiter is disabled and the slave arbiter is enable to provide such arbitration.

6. A data storage system wherein a host computer is coupled to a bank of disk drives through an interface, such interface comprising:
   a memory comprising a high address memory section and a low address memory section;
   a plurality of directors for controlling data transfer between the host computer and the bank of disk drives as such data passes through the memory;
   a pair of high address busses electrically connected to the high address memory and a pair of low address busses electrically connected to the low address memory; and wherein each one of the directors is electrically connected to one of the pair of high address busses and one of the pair of low address busses;

an arbiter electrically connected to the busses.

7. The system recited in claim 6 wherein the arbiter is connected to an end of the busses.

8. The system recited in claim 7 including a second arbiter connected to another end of each one of the busses, one of the arbiters connected to one end of a bus being a master arbiter and the other one of the arbiters connected to such bus is a slave arbiter.

9. The system recited in claim 8 wherein the master arbiter provides arbitration between directors connected to the bus connected to the master and slave arbiter and, if one of the directors connected to such bus indicates a fault, the master arbiter is disabled and the slave arbiter is enable to provide such arbitration.

10. The system recited in claim 9 wherein the system includes a printed circuit board having:

the plurality of busses:

a plurality of electrical connectors arranged in a linear array and electrically connected to the busses, such electrical connectors being adapted to receive the directors on one side of the printed circuit board and adapter cards on the other side of the printed circuit board, the director and adapter cards received in a common one of the electrical connectors being electrically connected by pins passing from one side to the other side of the printed circuit board; and wherein adapter cards connected to the terminating ends of the busses are received in end ones of the electrical connectors have thereon the master arbiter and slave arbiter electrically connected to such bus.

11. The system recited in claim 10 wherein the pins in the electrical connectors at the ends of the bus are adapted to receive either an adapter card having the master arbiter or an adapter card having the slave arbiter, and wherein the electrical connectors at one end of the bus has a reference electrical potential thereon and the one of the electrical connectors at the other end of the bus has a high impedance thereon, such reference electrical potential configuring the adapted card connected thereto into one of the master or slave arbiters and the high impedance configuring the adapted card connected thereto into the slave or master arbiters.

12. The system recited in claim 11 wherein each one of the directors is adapted to produce on the bus coupled thereto a plural bit priority code and wherein each one of the arbiters is responsive to the priority codes of the directors coupled thereto and for assigning access to such bus coupled to such directors and arbiter selectively in accordance with a predetermined criteria.

13. A data storage system wherein a host computer is coupled to a bank of disk drives through an interface, such interface comprising:

a memory;

a plurality of directors for controlling data transfer between the host computer and the bank of disk drives as such data passes through the memory;

a plurality of adapted cards, one of such adapted cards having an arbiter thereon;

a printed circuit board having:

a plurality of busses:

a plurality of electrical connectors electrically connected to the busses, such electrical connectors being adapted to receive the directors, the memory and the adapter cards; and wherein one of the electrical connectors has a reference electrical potential on a pin thereof and another one of the electrical connectors has a high impedance on a pin thereof, such pins having the same position in the connector thereof, such reference electrical potential configuring the arbiter of the adapted card thereof into one of a master arbiter or a slave arbiter and the high impedance configuring the arbiter of the adapted card thereon into the slave arbiter or the master arbiter, respectively.

14. The system recited in claim 13 wherein the master arbiter provides arbitration between directors connected to the bus connected to the master and slave arbiter and, if one of the directors connected to such bus indicates a fault, the master arbiter is disabled.

* * * * *